US009908974B2

(12) United States Patent
Kobayashi et al.

(10) Patent No.: US 9,908,974 B2
(45) Date of Patent: Mar. 6, 2018

(54) POLYARYLENE SULFIDE PRODUCTION METHOD AND POLYARYLENE SULFIDE PRODUCTION APPARATUS

(71) Applicant: Kureha Corporation, Tokyo (JP)

(72) Inventors: Masanori Kobayashi, Tokyo (JP); Tomoyoshi Koizumi, Tokyo (JP); Mitsuhiro Matsuzaki, Tokyo (JP); Hirohito Kawama, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 15/303,032

(22) PCT Filed: Apr. 21, 2015

(86) PCT No.: PCT/JP2015/062087
§ 371 (c)(1),
(2) Date: Oct. 10, 2016

(87) PCT Pub. No.: WO2015/166838
PCT Pub. Date: Nov. 5, 2015

(65) Prior Publication Data
US 2017/0029570 A1   Feb. 2, 2017

(30) Foreign Application Priority Data

Apr. 30, 2014 (JP) ................................ 2014-093542

(51) Int. Cl.
*C08G 75/04* (2016.01)
*C08G 75/0281* (2016.01)
(Continued)

(52) U.S. Cl.
CPC .......... *C08G 75/0281* (2013.01); *B01D 29/11* (2013.01); *B01D 29/66* (2013.01);
(Continued)

(58) Field of Classification Search
CPC .. C08G 75/025; C08G 75/14; C08G 75/0263; C08G 75/0268; C08G 75/0259
See application file for complete search history.

(56) References Cited

U.S. PATENT DOCUMENTS

| 4,769,426 A | 9/1988 | Iwasaki et al. |
| 4,830,505 A * | 5/1989 | Dunton ................. B01F 3/1221 366/136 |

(Continued)

FOREIGN PATENT DOCUMENTS

| CN | 102892490 A | 1/2013 |
| CN | 102985466 A | 3/2013 |

(Continued)

OTHER PUBLICATIONS

Kayama et al., Abstract of JP406226731A, Aug. 1994.*

(Continued)

*Primary Examiner* — Shane Fang
(74) *Attorney, Agent, or Firm* — Abel Law Group, LLP

(57) ABSTRACT

The present invention provides a production method and a production apparatus for a polyarylene sulfide (PAS), thus the formation of a floating polymer and the leakage of the floating polymer to the outside of the vessel in a washing step are prevented, to achieve steady production of the polymer with high quality, to improve the yield of the polymer and to reduce environmental load, wherein the floating polymer refers to a particles of the polymer which are floating on the surface of a washing solution, in the upper part of the inside of a washing vessel, as a result of the adhesion of a gas onto the surface of the particles of the polymer.

The present invention provides a production method for a PAS comprising step (I), performing polymerization, step (II), separating and collecting a polymer, step (III), washing a slurry, and step (IV), collecting the polymer after washing, (Continued)

wherein an aqueous medium is sprayed onto a PAS floating on the surface of the aqueous washing solution in the upper part of the inside of the washing vessel in step (III) (step (IIIa), washing a slurry using a counter current, and/or step (IIIb), treating a slurry with acid using a counter current, or the like); and a production apparatus for a PAS comprising a washing device (counter current washing device and/or a counter current contact/acid treatment device or the like) having an aqueous medium spray means.

15 Claims, 1 Drawing Sheet

(51) Int. Cl.
| | |
|---|---|
| C08G 75/0254 | (2016.01) |
| C08G 75/0213 | (2016.01) |
| B01D 29/11 | (2006.01) |
| B01D 29/66 | (2006.01) |
| B08B 3/04 | (2006.01) |
| C08G 75/0209 | (2016.01) |
| C08G 75/0259 | (2016.01) |

(52) U.S. Cl.
CPC ............ *B08B 3/04* (2013.01); *C08G 75/0209* (2013.01); *C08G 75/0213* (2013.01); *C08G 75/0254* (2013.01); *C08G 75/0259* (2013.01); *C08G 75/04* (2013.01)

(56) References Cited

U.S. PATENT DOCUMENTS

| | | | |
|---|---|---|---|
| 5,143,554 | A | 9/1992 | Koyama et al. |
| 6,734,282 | B1 | 5/2004 | Wagener et al. |
| 7,094,867 | B2 | 8/2006 | Miyahara et al. |
| 8,596,858 | B2 | 12/2013 | Ohashi et al. |
| 8,981,041 | B2 | 3/2015 | Kimura et al. |
| 2003/0150804 | A1 | 8/2003 | Haubs et al. |
| 2005/0087215 | A1 | 4/2005 | Miyahara et al. |
| 2013/0068256 | A1 | 3/2013 | Kobayashi et al. |
| 2013/0116401 | A1 | 5/2013 | Kimura et al. |

FOREIGN PATENT DOCUMENTS

| | | | |
|---|---|---|---|
| EP | 0648797 | A2 | 4/1995 |
| JP | S6248728 | A | 3/1987 |
| JP | H0386287 | A | 4/1991 |
| JP | H07118389 | A | 5/1995 |
| JP | 2002542324 | A | 12/2002 |
| JP | 2008513186 | A | 5/2008 |
| JP | 2008274294 | A | 11/2008 |
| WO | 2003048231 | A1 | 6/2003 |
| WO | 2011145424 | A1 | 11/2011 |
| WO | 2012008340 | A1 | 1/2012 |

OTHER PUBLICATIONS

International Search Report of PCT/JP2015/062087 dated Jun. 30, 2015.
Office Action for Chinese Patent Application No. 201580011534.7 dated Feb. 20, 2017, English Translation attached, 10 pages.

* cited by examiner

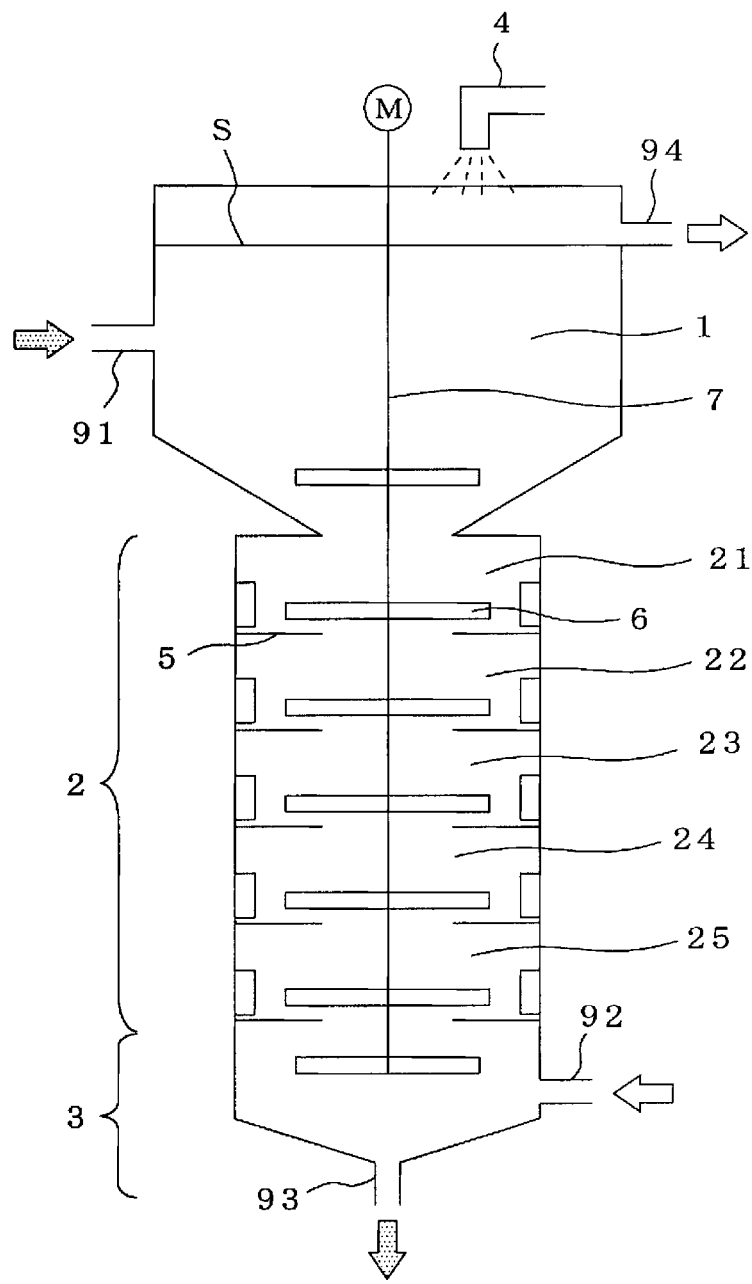

POLYARYLENE SULFIDE PRODUCTION METHOD AND POLYARYLENE SULFIDE PRODUCTION APPARATUS

TECHNICAL FIELD

The present invention relates to a production method for a polyarylene sulfide comprising a polymerization step, a separation step, a washing step, an acid treatment step as desired, and a collection step, wherein the leakage of a polymer in the washing step and, if desired, the acid treatment step is prevented so as to improve product yield and to reduce the environmental load; and a production apparatus for a polyarylene sulfide.

BACKGROUND ART

Polyarylene sulfides (also abbreviated as "PAS" hereafter) such as polyphenylene sulfides (also abbreviated as "PPS" hereafter) are engineering plastics having excellent heat resistance, chemical resistance, flame retardant properties, mechanical strength, electrical properties, dimensional stability, and the like. PASs are commonly used in a wide range of technical fields such as electrical equipment, electronic equipment, automobile equipment, and packaging materials since PASs can be molded into various molded products, films, sheets, fibers, and the like by means of a general melt processing method such as extrusion molding, injection molding, or compression molding.

A known representative example of a PAS production method is a method of reacting a sulfur source with a dihalo aromatic compound such as paradichlorobenzene (also abbreviated as "pDCB" hereafter) in an organic amide solvent such as N-methyl-2-pyrrolidone (also abbreviated as "NMP" hereafter). An alkali metal sulfide, an alkali metal hydrosulfide, or a mixture thereof is typically used as a sulfur source. If an alkali metal hydrosulfide is used as a sulfur source, the alkali metal hydrosulfide is used in combination with an alkali metal hydroxide.

The polymerization reaction of the sulfur source and the dihalo aromatic compound is a desalting polycondensation reaction, and a large amount of a salt such as NaCl (that is, an alkali metal halide) is produced after the reaction. Since the reaction uses a sulfur-containing compound, hydrogen sulfide is also produced as a product or a by-product. Therefore, conventionally, after a PAS polymer produced by the polymerization reaction is separated from the reaction solution and collected, the collected polymer is washed using a washing agent such as water, an organic solvent, or a mixture of water and an organic solvent so as to remove salts such as NaCl, oligomers, or the like.

Washing methods are broadly classified into batch washing and continuous washing methods. Batch washing is a method of repeating a process of stirring and washing a collected polymer with a washing agent in a washing vessel all at once or in separate batches. In batch washing, a large-capacity washing vessel is often required, which results in a complex equipment and an increased construction cost, while at the same time leading to increases in the amount of washing liquid consumed, increases in the amount of drainage treated, increases in agitation power, and increases in operating costs.

A counter current washing method has been proposed as a type of continuous washing, wherein a polymer in a wet state and an organic solvent or water serving as a washing agent are brought into contact with one another by means of a counter current. For example, it is proposed in Document 1 (Japanese Unexamined Patent Application Publication No. H03-86287A) to bring a granular resin such as a PPS into contact with a washing solution by means of a counter current inside a vertically erected tubular body having static mixing elements arranged continuously in series. It is proposed in Document 2 (WO/2003/048231) to bring a polymer slurry containing a polymer into contact with a washing solution by means of a counter current using a roughly V-shaped tube device having a downward tube part and an upward tube part. In addition, a vertical solid-liquid contact device comprising a plurality of stirring chambers arranged continuously in the vertical direction is disclosed in Document 3 (Japanese Unexamined Patent Application Publication (Translation of PCT Application) No. 2008-513186).

The idea of repeating continuous washing or performing batch washing prior to continuous washing is also known.

In the PAS production process, an acid treatment step of treating the PAS polymer using an acidic compound such as hydrochloric acid or acetic acid was arranged immediately after the washing step so as to completely remove impurities such as water-soluble metal salts and to remove basic residues of the polymer chain terminals of the PAS. One method of the acid treatment step is a method of stirring, for a prescribed amount of time, a reslurry prepared by adding an aqueous solution of an acidic compound to a slurry prepared by dispersing a washed PAS in an aqueous medium, as described in Document 4 (Japanese Unexamined Patent Application Publication No. S62-48728A) or Document 5 (Japanese Unexamined Patent Application Publication No. H7-118389A). In this case, after acid treatment, it is necessary to completely remove the acid components by sufficiently washing the solution with water after neutralizing the solution with a base as necessary. Therefore, as described in Document 2 above, with a method of performing acid treatment by bringing a washed PAS slurry into contact with an aqueous washing solution by means of a counter current after adding an acidic compound to the PAS slurry, the water-washing operation performed to remove acid components originating from the acidic compound after acid treatment is unnecessary, so this method is effective.

With the objective of stably producing a high-quality PAS, the present inventors began dedicated research on effectively performing a washing step, for example, a counter current washing step and/or a counter current contact/acid treatment step, in the PAS production process.

In the washing step, a slurry of a PAS polymer comes into contact with a washing solution in a washing vessel. The specific gravity of PAS particles (also called "PAS polymer particles" hereafter) is originally greater than 1, so most PAS particles move downward due to gravity. However, some particles do not migrate to the bottom of the treatment vessel in spite of having a larger specific gravity than the washing solution and continue to float on the surface of the washing solution in the upper part of the inside the washing vessel. As a result, the PAS cannot be sufficiently separated and collected after washing treatment based on the specific gravity difference between the PAS particles and the washing solution, and the present inventors were confronted with the problem that the PAS particles floating on the liquid surface leak to the outside of the washing vessel as washing drainage together with the washing solution.

In a counter current washing step or a counter current contact/acid treatment step, although most PAS particles migrate downward due to gravity as a result of the PAS polymer slurry and the washing solution coming into contact by means of a counter current, some PAS particles do not migrate to the bottom of the treatment vessel in spite of having a larger specific gravity than the washing solution, and the PAS particles sometimes migrate upward together with the washing solution and float on the surface of the washing surface in the upper part of the inside the washing vessel. As a result, as described above, the PAS cannot be sufficiently separated and collected after counter current washing or counter current contact/acid treatment, which leads to the problem that the PAS particles floating on the liquid surface leak to the outside of the washing vessel as washing drainage together with the washing solution.

The PAS particles floating on the liquid surface also include extremely fine particles that are difficult to collect with a conventional method, but most of the particles are basically PAS particles that can be used in the production process, and the fact that such PAS particles leak out without being collected as a product leads directly to a reduction in product yield. Moreover, another problem was also discovered, wherein the amount of PAS particles separated and collected is not stable, and the product yield fluctuates among the obtained experimental lots.

Decreases in product yield, fluctuations in product yield, and fluctuations in product composition associating such fluctuations could conceivably have a large direct effect on quality in terms of the particle properties such as the particle size or particle size distribution of the produced PAS, the average molecular weight or melt viscosity, the mixing stability with other raw materials or melt processing stability when obtaining a molded product, or the thermal and mechanical characteristics of the molded product, so the present inventors continued to conduct dedicated research on the causes of and solutions to the aforementioned problems associated with washing or acid treatment.

As a result, the present inventors obtained the following knowledge with regard to the cause of the floating of fine PAS particles or the like on the surface of the washing solution in the upper part of the inside of the washing vessel when performing washing treatment on the PAS or when performing acid treatment on the PAS slurry after washing treatment.

Specifically, in washing treatment such as counter current washing and counter current contact/acid treatment, a slurry of a PAS polymer fed at a relatively high temperature ordinarily comes into contact with a washing solution having a relatively low temperature. In this process, if the temperature of the washing solution having a relatively low temperature increases, the air, oxygen, or the like that had been dissolved in the washing solution may be dissociated from the liquid as a gas and may float due to a decrease in the gas solubility in liquid resulting from the temperature increase. In addition, air incorporated into the liquid phase inside the washing vessel due to stirring associated with washing treatment such as counter current washing or counter current contact/acid treatment, air infiltrating the particles during the polymerization step or separation step, gases produced at the time of acid treatment, and the like are dissociated from the liquid phase or the particles as gases and may float. This phenomenon occurs markedly in winter or in cold regions where the temperature of the washing solution is low.

The present inventors discovered that if these gases are adsorbed onto PAS polymer particles, in particular, particles having a small particle size, particles having many voids, particles having a rough surface, or the like, the PAS polymer particles with adsorbed gases tend to easily migrate toward the top of the washing vessel together with the washing solution, even if the inherent difference in specific gravity between the PAS particles and the washing solution is large, and that the PAS polymer particles eventually emerge as polymers in a floating state (also called a "floating polymer" hereafter) on the liquid surface of the washing solution in the upper part inside the washing vessel.

The present inventors further discovered that in counter current washing or counter current contact/acid treatment, in particular, the sedimentation rate of particles varies depending on the composition and temperature of the liquid phase in the slurry of the PAS polymer and the composition and temperature of the washing solution. Thus the present inventors therefore also focused attention on the fact that a floating polymer may also be formed as a result of the aforementioned gases adsorbed onto the polymer.

In the washing treatment of the slurry of the PAS polymer, the slurry of the PAS polymer is introduced from the top of the washing vessel, and the slurry settles in the washing solution due to gravity and is discharged from the base of the washing vessel. In particular, in counter current washing and in counter current contact/acid treatment in which the PAS polymer slurry is brought into contact with the washing solution using a counter current after an acidic compound is added to the PAS polymer slurry, the PAS polymer slurry is transported from top to bottom in the washing vessel, and the washing solution is transported from bottom to top so as to continuously bring the washing solution into contact with the PAS slurry using a counter current. In this case as well, the slurry of the PAS polymer is introduced from the top of the washing vessel, and the slurry settles in the washing solution due to gravity and is discharged from the base of the washing vessel. On the other hand, the washing solution is introduced from the base of the washing vessel and is discharged from the top of the washing vessel.

The floating polymer described above is in a floating state on the surface of the washing solution in the upper part of the inside of the washing vessel, so the floating polymer leaks to the outside of the washing vessel together with the washing solution as the washing solution is discharged to the outside of the washing vessel from the top of the washing vessel, which prevents the floating polymer from being separated and collected as a product. The present inventors confirmed that there are cases in which the amount of the floating polymer that leaks to the outside of the washing vessel reaches several percent of the PAS polymer produced by the polymerization reaction and discovered that in order to achieve the stable production of high-quality PAS, to improve the product yield, and to reduce the environmental load (amount of suspended substances in the waste water), it is necessary to prevent the production of a floating polymer and to prevent leakage to the outside of the washing vessel.

CITATION LIST

Patent Literature

Patent Document 1: Japanese Unexamined Patent Application Publication No. H03-86287A
Patent Document 2: WO/2003/048231
Patent Document 3: Japanese Unexamined Patent Application Publication (Translation of PCT Application) No. 2008-513186
Patent Document 4: Japanese Unexamined Patent Application Publication No. S62-48728A
Patent Document 5: Japanese Unexamined Patent Application Publication No. H07-118389A

SUMMARY OF INVENTION

Technical Problem

An object of the present invention is to provide a production method for a PAS wherein, in a washing step such as a counter current washing step and/or a counter current contact/acid treatment step, for example, of a PAS production method comprising a polymerization step, a separation step, a washing step, and a collection step, it is possible to prevent the production of a floating polymer in a floating state on the surface of a washing solution in the upper part of the inside of a washing vessel and the leakage of the floating polymer to the outside of the vessel due a gas adsorption to the surface of the polymer particles, which makes it possible to achieve the stable production of a high-quality PAS, to improve the product yield, and to reduce the environmental load; and a production apparatus for a PAS using the production method.

Solution to Problem

As a result of conducting dedicated research on methods for solving these problems, the present inventors discovered a production method for a PAS comprising a polymerization step, a separation step, a washing step such as a counter current washing step and a counter current contact/acid treatment step if desired, for example, and a collection step, wherein an aqueous medium is sprayed onto a PAS floating on the surface of the washing solution in the upper part of the inside of the washing vessel in the washing step.

Thus the present invention provide a production method for a polyarylene sulfide comprising the steps of:
(I) performing polymerization to produce a polymer via polymerization reaction on: at least one type of a sulfur source selected from the group consisting of an alkali metal sulfide and an alkali metal hydrosulfide; and
a dihalo aromatic compound;
(II) separating and collecting a polymer from a reaction solution containing the polymer produced by the polymerization reaction;
(III) washing a slurry of the collected polymer by bringing the slurry into contact with at least one type of a washing solution selected from the group consisting of water, an organic solvent, and a mixed solution of water and an organic solvent, in a washing vessel; and
(IV) collecting the polymer after washing; an aqueous medium being sprayed onto the polyarylene sulfide floating on a surface of the washing solution in an upper part of the inside of the washing vessel in step (III).

The present invention also provides the following production methods for a PAS according to (1) to (15) as embodiments.

(1) The production method for a PAS described above, wherein step (III) includes the step of:
(IIIa) washing a slurry using a counter current by transporting a slurry of the collected polymer from top to bottom and transporting at least one type of washing solution selected from the group consisting of water, an organic solvent, and a mixed solution of water and an organic solvent from bottom to top, in the washing vessel, so as to continuously bring the washing solution into contact with the slurry using a counter current.

(2) The production method for a PAS described above, wherein, between step (IIIa) and step (IV), step (III) includes the step of:

(IIIb) treating a slurry with acid using a counter current by: transporting a slurry of the polymer containing an acidic compound, from top to bottom, the slurry of the polymer collected via step (IIIa); and
transporting an aqueous washing solution from bottom to top;
in the washing vessel so as to continuously bring the aqueous washing solution into contact with the slurry using a counter current;
wherein an aqueous medium is sprayed onto the PAS floating on the surface of the washing solution in the upper part of the inside of the washing vessel in at least one of steps (IIIa) or (IIIb).

(3) The production method for a PAS described above, wherein the aqueous medium is sprayed with a nozzle device.

(4) The production method for a PAS described above, wherein the nozzle device comprises a plurality of nozzles.

(5) The production method for a PAS described above, wherein the nozzle device comprises a swivelable nozzle.

(6) The production method for a PAS described above, wherein the washing vessel is a washing column.

(7) The production method for a PAS described above, wherein the acidic compound is hydrochloric acid or acetic acid.

(8) The production method for a PAS described above, wherein step (III) is repeatedly performed more than once.

(9) The production method for a PAS described above, wherein at least part of the slurry of the polymer contains a composition prepared outside the washing vessel.

(10) The production method for a PAS described above, wherein, in step (I), a polymerization reaction is performed on at least one type of a sulfur source selected from the group consisting of an alkali metal sulfide and an alkali metal hydrosulfide and a dihalo aromatic compound in an organic amide solvent in the presence of a phase separation agent at a temperature of from 170 to 290° C.

(11) The production method for a PAS described above, wherein the phase separation agent is added prior to step (II).

(12) The production method for a PAS described above, wherein the phase separation agent is at least one type selected from the group consisting of water, an organic carboxylic acid metal salt, an organic sulfonic acid metal salt, an alkali metal halide, an alkali earth metal halide, an alkali earth metal salt of an aromatic carboxylic acid, a phosphoric acid alkali metal salt, alcohols, and paraffin-based hydrocarbons.

(13) The production method for a PAS described above, wherein, prior to step (I), the production method comprises the steps of:
(A) dehydrating a mixture by heating and reacting a mixture containing an organic amide solvent, a sulfur source containing an alkali metal hydrosulfide, and an alkali metal hydroxide in an amount of from 0.95 to 1.05 mol per 1 mol of the alkali metal hydrosulfide, and discharging at least part of a distillate containing water from inside a system containing the mixture to the outside of the system; and
(B) preparing a mixture by adding an alkali metal hydroxide and water as necessary to the mixture remaining inside the system after (A) to adjust the mixture so that a total moles of an alkali metal hydroxide formed together with hydrogen sulfide produced at the time of dehydration, an alkali metal hydroxide prior to dehydration and the alkali metal hydroxide added after dehydration, is from 1.00 to 1.09 mol per 1 mol of the charged sulfur source and so that moles of water is from 0.02 to 2.0 mol per 1 mol of the charged sulfur source.

(14) The production method for a PAS described above, further including:

(V) re-separating a PAS particle by feeding the washing drainage discharged from the washing vessel to a PAS particle re-separation unit loaded with a filter so as to capture PAS particles and then re-separate and discharge the PAS particles from the filter.

(15) The production method for a PAS described above, wherein step (V) is repeatedly performed more than once.

The present invention also provides the production method for a PAS described above, including a step of washing a slurry of the PAS by bringing the slurry into contact with at least one type of a washing solution selected from the group consisting of water, an organic solvent, and a mixed solution of water and an organic solvent, in a washing vessel; wherein an aqueous medium is sprayed onto the PAS floating on a surface of the washing solution in an upper part of the inside of the washing vessel in the step of washing.

The present invention further provides the production apparatus for a PAS described above, the production apparatus comprising a washing device for washing a slurry of a polymer by bringing the slurry into contact with at least one type of a washing solution selected from the group consisting of water, an organic solvent, and a mixed solution of water and an organic solvent, in a washing vessel; the washing device having an aqueous medium spraying unit for spraying an aqueous medium onto the PAS floating on a surface of the washing solution in an upper part of the inside of the washing vessel.

In addition, the present invention provides production apparatuses for a PAS according to the following (A) to (J) as embodiments.

(A) The production apparatus for a PAS described above, wherein the washing device comprises a top part, a main body part, and a base, has a slurry feeding port and a washing drainage discharge port in the top part, and has a washing vessel having a polymer discharge port and a washing solution feeding port in the base; the washing device has a counter current washing device for transporting a slurry of the polymer from top to bottom and transporting at least one type of a washing solution selected from the group consisting of water, an organic solvent, and a mixed solution of water and an organic solvent from bottom to top, in the washing vessel so as to continuously bring the washing solution into contact with the slurry using a counter current; and the counter current washing device has an aqueous medium spraying unit connected to the top part.

(B) The production apparatus for a PAS described above, wherein the washing device comprises a top part, a main body part, and a base, has a slurry feeding port and a washing drainage discharge port in the top part, and has a washing vessel having a polymer discharge port and an aqueous washing solution feeding port in the base; the washing device has a counter current contact/acid treatment device for transporting a slurry of the polymer containing an acidic compound from top to bottom and transporting an aqueous washing solution from bottom to top in the washing vessel so as to continuously bring the aqueous washing solution into contact with the slurry using a counter current; and the counter current washing device and/or the counter current contact/acid treatment device has an aqueous medium spraying unit connected to the top part.

(C) The production apparatus for a PAS described above, wherein the aqueous medium spraying unit is a nozzle device.

(D) The production apparatus for a PAS described above, wherein the nozzle device comprises a plurality of nozzles.

(E) The production apparatus for a PAS described above, wherein the nozzle device has a nozzle swiveling device.

(F) The production apparatus for a PAS described above, wherein the washing vessel is a washing column.

(G) The production apparatus for a PAS described above, wherein the counter current contact/acid treatment device further comprises a re-slurry vessel connected to the slurry feeding port so as to prepare a slurry containing an acidic compound.

(H) The production apparatus for a PAS described above, wherein the counter current contact/acid treatment device further has an acidic compound feeding port in the washing vessel.

(I) The production apparatus for a PAS described above, wherein at least part of the slurry of the polymer contains a composition prepared outside the washing vessel.

(J) The production apparatus for a PAS described above, further comprising a PAS particle re-separation device having a PAS particle capturing unit equipped with a filter, to which a washing drainage discharged from the washing vessel is fed to capture PAS particles; and a backwash unit for re-separating and discharging PAS particles from the filter.

Advantageous Effects of Invention

The present invention provides a production method for a polyarylene sulfide comprising the steps of:
(I) performing polymerization to produce a polymer via polymerization reaction on:
at least one type of a sulfur source selected from the group consisting of an alkali metal sulfide and an alkali metal hydrosulfide; and
a dihalo aromatic compound;
(II) separating and collecting a polymer from a reaction solution containing the polymer produced by the polymerization reaction;
(III) washing a slurry of the collected polymer by bringing the slurry into contact with at least one type of a washing solution selected from the group consisting of water, an organic solvent, and a mixed solution of water and an organic solvent, in a washing vessel; and
(IV) collecting the polymer after washing;
an aqueous medium being sprayed onto the polyarylene sulfide floating on a surface of the washing solution in an upper part of the inside of the washing vessel in step (III). Therefore, it is possible to prevent some of the polymer particles from becoming a floating polymer that floats on the surface of the washing solution in the upper part of the inside of the washing vessel and to prevent the floating polymer from leaking to the outside of the washing vessel together with the washing drainage as a result of a gas adsorbed onto the surface of the PAS polymer particles in the step of washing, for example, the step of washing a slurry using a counter current and/or the step of treating a slurry with acid using a counter current, of the production method for a PAS comprising (I) a step of performing polymerization, (II) a step of separating and collecting polymer, (III) a step of washing, and (IV) a step of collecting, which makes it possible to achieve the stable production of high-quality PAS as well as an improvement in product yield, and to reduce the environmental load. More specifically, with the production method for a PAS according to the present invention, the floating polymer that conventionally leaked to the outside of the washing vessel together with the washing drainage is collected as a product, and as a result, it becomes possible to achieve the stable production of a high-quality PAS and an improvement in the product yield without any quality fluctuation between product batches, and to reduce the environmental load. The effect of the production method for a PAS according to the present invention is particularly marked in winter or in cold regions where the temperature of the washing solution is low.

In addition, the present invention provides a production apparatus for a PAS, the production apparatus comprising a washing device for washing a slurry of a polymer by bringing the slurry into contact with at least one type of a washing solution selected from the group consisting of water, an organic solvent, and a mixed solution of water and an organic solvent, in a washing vessel; the washing device having an aqueous medium spraying unit for spraying an aqueous medium onto the PAS floating on a surface of the washing solution in an upper part of the inside of the washing vessel. Therefore, it is possible to prevent the production of a floating polymer in a floating state on the surface of the washing solution in the upper part of the inside of the washing vessel and the leakage to the outside of the washing vessel due to a gas adsorbing to the surface of the polymer particles in step (III). Thus, the present invention exhibits the effect of making it possible to provide a production apparatus for a PAS, by means of simple improvements to a conventional production apparatus for a PAS, and such production apparatus can contribute to the stable production of a high-quality polymer, the improvement of the polymer yield, and the reduction of the environmental load. More specifically, with the production apparatus for a PAS according to the present invention, formation of a floating polymer and leakage to the outside of the washing vessel are prevented. Thus such a production apparatus exhibits the effect of enabling the stable production of a high-quality PAS and an improvement in product yield without any quality variation among product batches, and making it possible to reduce the environmental load. The effect of the production apparatus for a PAS according to the present invention is particularly marked in winter or in cold regions where the temperature of the washing solution is low.

As a result, a PAS obtained by the production method of the present invention is suitable for the application of a general melt processing method such as extrusion molding, injection molding, or compression molding and can be suitably used as a sealant or coating for electronic parts, for example, in a wide range of fields such as electrical/electronic equipment and automobile equipment.

BRIEF DESCRIPTION OF DRAWING

FIG. 1 is a schematic diagram of a specific example of a counter current washing device provided in the production apparatus for a PAS according to the present invention.

DESCRIPTION OF EMBODIMENTS

1. Polymerization Reaction Components
[1] Sulfur Source
In the present invention, at least one type of sulfur source selected from the group consisting of an alkali metal sulfide and an alkali metal hydrosulfide is used as a sulfur source. Examples of alkali metal sulfides include lithium sulfide, sodium sulfide, potassium sulfide, rubidium sulfide, cesium sulfide, and mixtures of two or more types thereof. Examples of alkali metal hydrosulfides include lithium hydrosulfide, sodium hydrosulfide, potassium hydrosulfide, rubidium hydrosulfide, cesium hydrosulfide, and mixtures of two or more types thereof.

The alkali metal sulfide may be used as an anhydride, a hydrate, or an aqueous solution. Of these, sodium sulfide and lithium sulfide are preferable in that they can be obtained industrially inexpensively. The alkali metal sulfide is preferably used as an aqueous mixture such as an aqueous solution (that is, a mixture with fluid water) from the perspective of the treatment operation, weighing, or the like.

The alkali metal hydrosulfide may be used as an anhydride, a hydrate, or an aqueous solution. Of these, sodium hydrosulfide and lithium hydrosulfide are preferable in that they can be obtained industrially inexpensively. The alkali metal hydrosulfide is preferably used as an aqueous solution or an aqueous mixture (that is, a mixture with fluid water) from the perspective of the treatment operation, weighing, or the like.

A small amount of an alkali metal hydrosulfide may also be contained in the alkali metal sulfide used in the present invention. In this case, the total molar amount of the alkali metal sulfide and the alkali metal hydrosulfide serves as the sulfur source used in the polymerization reaction, that is, the "charged sulfur source".

A small amount of an alkali metal sulfide may also be contained in the alkali metal hydrosulfide used in the present invention. In this case, the total molar amount of the alkali metal hydrosulfide and the alkali metal sulfide serves as the charged sulfur source. If an alkali metal sulfide and an alkali metal hydrosulfide are mixed and used, a mixture of both substances naturally becomes the charged sulfur source.

If the sulfur source contains an alkali metal hydrosulfide, it is preferable to use an alkali metal hydroxide in combination. Examples of alkali metal hydroxides include lithium hydroxide, sodium hydroxide, potassium hydroxide, rubidium hydroxide, cesium hydroxide, and mixtures of two or more types thereof. Of these, sodium hydroxide and lithium hydroxide are preferable in that they can be obtained industrially inexpensively. The alkali metal hydroxide is preferably used as an aqueous solution or an aqueous mixture.

In the production method of the present invention, the water content to be removed in the dehydration step is hydrated water, an aqueous medium of an aqueous solution, water produced as a by-product of the reaction of an alkali metal hydrosulfide and an alkali metal hydroxide, and the like.

[2] Dihalo Aromatic Compound

The dihalo aromatic compound used in the present invention is a dihalogenated aromatic compound having two halogen atoms bonded directly to an aromatic ring. Halogen atoms refer to each of the atoms of fluorine, chlorine, bromine, and iodine, and the two halogen atoms may be the same or different in the same dihalo aromatic compound. These dihalo aromatic compounds may be used alone, or two or more types thereof may be used in combination. Specific examples of dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. Of these, p-dihalobenzene, m-dihalobenzene, and mixtures thereof are preferably used, p-dihalobenzene is more preferably used, and p-dichlorobenzene is particularly preferably used.

The charged amount of the dihalo aromatic compound used in the polymerization reaction is ordinarily from 0.90 to 1.50 mol, preferably from 1.00 to 1.10 mol, more preferably from 1.00 to 1.09 mol, and particularly preferably greater than 1.00 mol and not greater than 1.09 mol per 1 mol of the sulfur source present at the time that the polymerization reaction is begun in the step (I), that is, in step (B) of preparing a mixture, after the step (A) of dehydrating a mixture, arranged as necessary (called the "charged sulfur source" hereafter; this is an alkali metal sulfide and/or an alkali metal hydrosulfide at this point). In many cases, a good result can be obtained if the charged amount of the dihalo aromatic compound is within the range of from 1.01 to 1.09 mol. If the charged molar ratio of the dihalo aromatic compound with respect to the sulfur source is too large, it becomes difficult to produce a high-molecular-weight polymer. On the other hand, if the charged molar ratio of the dihalo aromatic compound with respect to the sulfur source is too small, decomposition reactions may occur easily, which makes it difficult to perform a stable polymerization reaction.

[3] Branching/Crosslinking Agent and Molecular Weight Adjuster

In order to introduce a branched or crosslinked structure into the produced PAS, a polyhalo compound (not necessarily an aromatic compound) to which three or more halogen atoms bond, an active hydrogen-containing halogenated aromatic compound, a halogenated nitro aromatic compound, or the like may be used in combination. A preferable polyhalo compound used as a branching/crosslinking agent is a trihalobenzene such as trichlorobenzene. In addition, a monohalo compound may be used in combination in order to form a terminal of a specific structure in the produced PAS resin or to adjust the polymerization reaction or molecular weight. As a monohalo compound, it is possible to use not only a monohalo aromatic compound, but also a monohalo aliphatic compound.

[4] Organic Amide Solvent

In the present invention, an organic amide solvent in the form of an aprotic polar organic solvent is used as a solvent for the dehydration reaction and the polymerization reaction. The organic amide solvent is preferably stable with respect to alkalis at high temperatures. Specific examples of organic amide solvents include amide compounds such as N,N-dimethylformamide and N,N-dimethylacetamide; N-alkylcaprolactam compounds such as N-methyl-ϵ-caprolactam; N-alkylpyrrolidone compounds or N-cycloalkylpyrrolidone compounds such as N-methyl-2-pyrrolidone and N-cyclohexyl-2-pyrrolidone; N,N-dialkylimidazolidinone compounds such as 1,3-dialkyl-2-imidazolidinone; tetraalkyl urea compounds such as tetramethyl urea; and hexaalkylphosphate triamide compounds such as hexamethyl phosphate triamide. These organic amide solvents may be used alone, or two or more types thereof may be used in combination.

Of these organic amide solvents, N-alkylpyrrolidone compounds, N-cycloalkylpyrrolidone compounds, N-alkylcaprolactam compounds, and N,N-dialkylimidazolidinone compounds are preferably used, and N-methyl-2-pyrrolidone (NMP), N-methyl-c-caprolactam, and 1,3-dialkyl-2-imidazolidinone are particularly preferably used. The amount of the organic amide solvent used in the polymerization reaction of the present invention is ordinarily in the range of from 0.1 to 10 kg per 1 mol of the sulfur source.

[5] Polymerization Aid

In the present invention, various polymerization aids can be used as necessary in order to promote the polymerization reaction. Specific examples of polymerization aids include water, organic carboxylic acid metal salts, organic sulfonic acid metal salts, alkali metal halides such as halogenated lithium, alkali earth metal halides, alkali earth metal salts of aromatic carboxylic acids, phosphoric acid alkali metal salts, alcohols, paraffin-based hydrocarbons, and mixtures of two or more types thereof which are typically known as PAS polymerization aids. A preferable organic carboxylic acid metal salt is an alkali metal carboxylate. Examples of alkali metal carboxylates include lithium acetate, sodium acetate, potassium acetate, sodium propionate, lithium valerate, lithium benzoate, sodium benzoate, sodium phenylacetate, potassium p-tolulate, and mixtures of two or more types thereof. Sodium acetate is particularly preferable as an alkali metal carboxylate since it is inexpensive and easy to obtain. The amount of the polymerization aid that is used differs depending on the type of the compound but is ordinarily in the range of from 0.01 to 10 mol, preferably from 0.1 to 2 mol, more preferably from 0.2 to 1.8 mol, and particularly preferably from 0.3 to 1.7 mol per 1 mol of the charged sulfur source. If the polymerization aid is an organic carboxylic acid metal salt, an organic sulfonate, or an alkali metal halide, the upper limit of the amount used is preferably not greater than 1 mol and more preferably not greater than 0.8 mol per 1 mol of the charged sulfur source.

[6] Phase Separation Agent

In the present invention, it is preferable to use various phase separation agents to promote the polymerization reaction so as to obtain a PAS with a high degree of polymerization in a short period of time. A phase separation agent is a compound having an effect of dissolving in an organic amide solvent so as to reduce the solubility of the PAS with respect to the organic amide solvent by itself or in the presence of a small amount of water. The phase separation agent itself is a compound which is not a solvent of the PAS.

In addition, in the present invention, a phase separation agent may be added so as to form a granular PAS prior to step (II) of separating and collecting a polymer, that is, at a late stage of step (I) of performing polymerization, immediately after the completion of the step (I), or after the completion of step (I), and the granular PAS particles may be separated in step (II).

A compound generally known to function as a phase separation agent in the technical field of PASs can be used as a phase separation agent. Phase separation agents also include the aforementioned compounds used as polymerization aids, but here, a phase separation agent refers to a compound used at a volume ratio that allows the compound to function as a phase separation agent in the phase separation/polymerization step. Specific examples of phase separation agents include at least one type selected from the group consisting of water, an organic carboxylic acid metal salt, an organic sulfonic acid metal salt, an alkali metal halide such as halogenated lithium, an alkali earth metal halide, an alkali earth metal salt of an aromatic carboxylic acid, a phosphoric acid alkali metal salt, alcohols, and paraffin-based hydrocarbons. Examples of preferable organic carboxylic acid metal salts include alkali metal carboxylic acid salts such as lithium acetate, sodium acetate, potassium acetate, sodium propionate, lithium valerate, lithium benzoate, sodium benzoate, sodium phenylacetate, and potassium p-tolulate. These phase separation agents may be used alone, or two or more types thereof may be used in combination. Of these phase separation agents, water, sodium acetate, or a combination of water and sodium acetate is particularly preferable in that the cost is low and after-treatment is easy.

The amount of the phase separation agent that is used differs depending on the type of the compound but is ordinarily in the range of from 0.01 to 10 mol, preferably from 0.01 to 9.5 mol, and more preferably from 0.02 to 9 mol per 1 mol of the charged sulfur source. If the amount of the phase separation agent is less than 0.01 mol or greater than 10 mol per 1 mol of the charged sulfur source, a phase-separated state cannot be sufficiently induced, and a PAS with a high degree of polymerization cannot be obtained.

If the production method of the present invention includes a step of performing polymerization in the presence of a phase separation agent by adding a phase separation agent, water is preferably added to the polymerization reaction system as a phase separation agent at a ratio of higher than 2.0 mol and not higher than 10 mol, preferably from 2.2 to 7 mol, and more preferably from 2.5 to 5 mol per 1 mol of the charged sulfur source. Other phase separation agents other than water such as organic carboxylic acid metal salts are used in a range of preferably from 0.01 to 3 mol, more preferably from 0.02 to 2 mol, and particularly preferably from 0.03 to 1 mol per 1 mol of the charged sulfur source.

Even in the case where water is used as a phase separation agent, it is preferable to use other phase separation agents other than water in combination as polymerization aids from the perspective of performing phase separation/polymerization efficiently. If water and another phase separation agent are used in combination in the phase separation/polymerization step, the total amount thereof should be an amount that makes it possible to induce phase separation. In the phase separation/polymerization step, water may be added to the polymerization reaction system at a ratio of higher than 2.0 mol and not higher than 10 mol, preferably from 2.2 to 7 mol, and more preferably from 2.5 to 5 mol per 1 mol of the charged sulfur source, and the other phase separation agent may be added in the range of preferably from 0.01 to 3 mol, more preferably from 0.02 to 2 mol, and particularly preferably from 0.03 to 1 mol. If water and another phase separation agent are used in combination, in order to perform phase separation/polymerization with a small amount of phase separation agents, water may be used in the range of from 0.5 to 10 mol, preferably from 0.6 to 7 mol, and particularly preferably from 0.8 to 5 mol per 1 mol of the charged sulfur source, and another phase separation agent such as an organic carboxylic acid metal salt, more preferably an organic carboxylic acid metal salt and particularly preferably an alkali metal carboxylate such as sodium acetate, may be used in combination in the range of from 0.001 to 0.7 mol, preferably from 0.02 to 0.6 mol, and particularly preferably from 0.05 to 0.5 mol per 1 mol of the charged sulfur source.

At least some of the phase separation agent may be present from the time of the charging of the polymerization reaction materials, and it is preferable to add the phase separation agent during the polymerization reaction and to adjust the amount to an amount sufficient to achieve phase separation.

2. Polymerization Reaction Step

[1] Dehydrating a Mixture, Step (A)

As a step prior to step (I) of performing polymerization, it is preferable to establish step (A) of dehydrating a mixture so as to adjust the water content in the reaction system. Step (A) is preferably performed with a method of heating and reacting a compound containing an organic amide solvent and an alkali metal sulfide in an inert gas atmosphere and discharging water to the outside of the system by distillation. If an alkali metal hydrosulfide is used as a sulfur source, step (A) of dehydrating a mixture is performed with a method of heating and reacting a compound containing an alkali metal hydrosulfide and an alkali metal hydroxide and discharging water to the outside of the system by distillation.

In step (A), the water content comprising aqueous water (crystal water), an aqueous medium, by-product water, or the like is removed until the amount is within the required range. In step (A), dehydration is ordinarily performed until the amount of water present in the polymerization system is from 0.02 to 2.0 mol, preferably from 0.05 to 1.8 mol, and more preferably from 0.5 to 1.6 mol per 1 mol of the charged sulfur source. As described above, the sulfur source after step (A) is called a "charged sulfur source". If the water content becomes too low in step (A), the water content may be adjusted to the desired water content by adding water prior to step (I) of performing polymerization.

If an alkali metal hydrosulfide is used as a sulfur source, it is preferable to heat and react a mixture containing an organic amide solvent, an alkali metal hydrosulfide, and an alkali metal hydroxide in an amount of from 0.95 to 1.05 mol per 1 mol of the alkali metal hydrosulfide and to discharge at least a part of the distillate containing water from inside the system containing the mixture to the outside of the system.

If the molar ratio of the alkali metal hydroxide per 1 mol of the alkali metal hydrosulfide in step (A) is too small, the amount of the sulfur component (hydrogen sulfide) volatilized in step (A) becomes too large, which may cause a reduction in productivity due to a decrease in the amount of the sulfur source or may tend to cause an abnormal reaction or a reduction in the quality of the produced PAS due to an increase in polysulfurized components in the charged sulfur source remaining after dehydration. If the molar ratio of the alkali metal hydroxide per 1 mol of the alkali metal hydrosulfide in the dehydration step is too large, alterations in the organic amide solvent may increase, or it may become difficult to stably perform the polymerization reaction, which may in turn lead to a decrease in the yield or quality of the produced PAS. The molar ratio of the alkali metal hydroxide per 1 mol of the alkali metal hydrosulfide in step (A) is preferably from 0.97 to 1.04 and more preferably from 0.98 to 1.03.

In many cases, the alkali metal hydrosulfide contains a small amount of an alkali metal sulfide, and the amount of the sulfur source becomes the total amount of the alkali metal hydrosulfide and the alkali metal sulfide. In addition, even if a small amount of an alkali metal sulfide is present in the alkali metal hydrosulfide, the molar ratio relative to the alkali metal hydroxide is calculated on the basis of the alkali metal hydrosulfide content (analytical value), and the molar ratio is adjusted.

The charging of each raw material into the reaction vessel in step (A) is typically performed in the temperature range of from room temperature (5 to 35° C.) to 300° C. and preferably from room temperature to 200° C. The order of how the raw materials are charged into the system can be arranged as needed, and each raw material may also be added at an intermediate stage during the dehydration operation. An organic amide solvent is used as a solvent in step (A). This solvent is preferably the same as the organic amide solvent used in the step (I), performing polymerization, and is particularly preferably NMP. The amount of the organic amide solvent used is ordinarily in the range of from approximately 0.1 to approximately 10 kg per 1 mol of the sulfur source charged into the reaction vessel.

The dehydration operation is performed by heating the mixture after the raw materials are charged into the reaction vessel ordinarily at a temperature of not higher than 300° C. and preferably in the temperature range of from 100 to 250°

C., ordinarily for from 15 minutes to 24 hours and preferably for from 30 minutes to 10 hours. The heating method may be a method of maintaining a constant temperature, a stepwise or continuous heating method, or a method combining both of these methods. Step (A) is performed with a batch method, a continuous method, or a combined method of both methods.

The device used to perform step (A) may be the same as or different than the reaction vessel (reactor) used in the subsequent step (I) of performing polymerization. The material of the device is preferably a corrosion-resistant material such as titanium. In step (A), some of the organic amide solvent is ordinarily discharged to the outside of the reaction vessel together with water. At this time, hydrogen sulfide is discharged to the outside of the system as a gas.

[2] Preparing a Mixture, Step (B)

In the present invention, an alkali metal hydroxide and water may be added as necessary to the mixture remaining inside the system after step (A) of dehydrating the mixture. In particular, if an alkali metal hydrosulfide is used as a sulfur source, it is preferable to adjust the amounts so that the total of: moles of the alkali metal hydroxide produced together with hydrogen sulfide at the time of dehydration; moles of the alkali metal hydroxide added before dehydration; and moles of alkali metal hydroxide added after dehydration; is from 1.00 to 1.09 mol, preferably greater than 1.00 and not greater than 1.09 mol, and more preferably from 1.001 to 1.085 mol per 1 mol of the sulfur source present in the system after step (A) (that is, the charged sulfur source) and so that moles of water is from 0.02 to 2.0 mol, preferably from 0.05 to 1.8 mol, and more preferably from 0.5 to 1.6 mol per 1 mol of the charged sulfur source. The amount of the charged sulfur source is calculated from the following formula: [charged sulfur source]=[total moles of charged sulfur]−[moles of volatilized sulfur after dehydration].

If hydrogen sulfide is volatilized in step (A), an alkali metal hydroxide is produced due to an equilibrium reaction, and the alkali metal hydroxide remains inside the system. It is therefore necessary to accurately grasp the amount of volatilized hydrogen sulfide to determine the molar ratio of the alkali metal hydroxide with respect to the sulfur source in step (B) of preparing a mixture.

If the molar ratio of the alkali metal hydroxide per 1 mol of the charged sulfur source is too large, alterations in the organic amide solvent may increase, and abnormal reactions or decomposition reactions may be easily induced at the time of polymerization. In addition, decreases in the yield or quality of the produced PAS are often induced. The molar ratio of the alkali metal hydroxide per 1 mol of the charged sulfur source is preferably from 1.005 to 1.085 mol, more preferably from 1.01 to 1.08 mol, and particularly preferably from 1.015 to 1.075 mol. The polymerization reaction is preferably performed while the alkali metal hydroxide is slightly in excess in order to perform the polymerization reaction stably and to obtain a high-quality PAS.

In the present invention, the sulfur source in step (B) of preparing a mixture is called a "charged sulfur source" in order to distinguish this sulfur source from the sulfur source used in step (A). The reason for this is that the amount of the sulfur source charged into the reaction vessel in step (A) varies in step (A). The charged sulfur source is consumed by a reaction with a dihalo aromatic compound in step (I) of performing polymerization. The molar amount of the charged sulfur source is based on the molar amount in step (B).

[3] Performing Polymerization, Step (I)

Step (I), performing polymerization, is performed by charging a dihalo aromatic compound into the mixture after the completion of step (A) and heating the sulfur source and the dihalo aromatic compound in an organic amide solvent. If a polymerization vessel different from the reaction vessel used in step (A) is used, the mixture after step (A) and the dihalo aromatic compound are charged into the polymerization vessel. The amount of the organic amide solvent or the water content present may be adjusted as necessary after step (A) or before step (I). In addition, polymerization aids or other additives may be mixed into the mixture before or during step (I).

The mixing of the mixture obtained after the completion of step (A) and the dihalo aromatic compound is ordinarily performed in the temperature range of from 100 to 350° C. and preferably from 120 to 330° C. If each component is charged into the polymerization vessel, the charging order is not particularly limited, and both components may be charged in divided parts or at one time.

In step (I), the polymerization reaction is typically initiated and polymerization is proceeded by heating the charged mixture to a temperature of from 170 to 290° C., preferably from 180 to 280° C., and more preferably from 190 to 275° C. The heating method that is used may be a method of maintaining a constant temperature, a stepwise or continuous heating method, or a method combining both of these methods. The polymerization reaction time is typically in the range of from 10 minutes to 72 hours and preferably from 30 minutes to 48 hours. The polymerization reaction is preferably performed in two steps including a pre-stage polymerization step and a post-stage polymerization step, and the polymerization time in this case is the total time of the pre-stage polymerization step and the post-stage polymerization step.

The amount of the organic amide solvent used in step (I) is ordinarily from 0.1 to 10 kg and preferably from 0.15 to 5 kg per 1 mol of the charged sulfur source present in step (I). As long as the amount is within this range, the amount may be varied during the polymerization reaction. The amount of water present at the beginning of the polymerization reaction is ordinarily in the range of from 0.02 to 2.0 mol, preferably from 0.05 to 1.8 mol, and more preferably from 0.5 to 1.6 mol per 1 mol of the charged sulfur source. The amount of water present is preferably increased during the polymerization reaction.

In step (I) of the production method for a PAS according to the present invention, a polymerization reaction is preferably performed on at least one type of a sulfur source selected from the group consisting of an alkali metal sulfide and an alkali metal hydrosulfide and a dihalo aromatic compound in an organic amide solvent in the presence of a phase separation agent at a temperature of from 170 to 290° C. The compound described above or the like is preferably used as a phase separation agent.

In step (I) of the production method for a PAS according to the present invention, it is more preferable to perform a polymerization reaction on at least one type of a sulfur source selected from the group consisting of an alkali metal sulfide and an alkali metal hydrosulfide and a dihalo aromatic compound in an organic amide solvent at a temperature of from 170 to 270° C. and, at the point when the conversion ratio of the dihalo aromatic compound reaches at least 30%, to add a phase separation agent to the polymerization reaction mixture and to then heat the polymerization reaction mixture and continue the polymerization reaction in the presence of the phase separation agent at a temperature of from 245 to 290° C.

In step (I) of the production method for a PAS according to the present invention, a polymerization reaction is preferably performed using at least two stages of polymerization comprising: a pre-stage polymerization step of performing a polymerization reaction on at least one type of a sulfur source selected from the group consisting of an alkali metal sulfide and an alkali metal hydrosulfide and a dihalo aromatic compound in an organic amide solvent so as to produce a polymer having a dihalo aromatic compound conversion ratio of from 80 to 99%; and a post-stage polymerization step of continuing the polymerization reaction in a phase-separated state in which a thick phase of the produced polymer and a thin phase of the produced polymer are mixed inside the polymerization reaction system.

In step (I) of the production method for a PAS according to the present invention, a polymerization reaction is more preferably performed using at least two stages of polymerization comprising: a pre-stage polymerization step of performing a polymerization reaction on at least one type of a sulfur source selected from the group consisting of an alkali metal sulfide and an alkali metal hydrosulfide and a dihalo aromatic compound at a temperature of from 170 to 270° C. in an organic amide solvent in the presence of from 0.02 to 2.0 mol of water per 1 mol of the charged sulfur source so as to produce a polymer having a dihalo aromatic compound conversion ratio of from 80 to 99%; and a post-stage polymerization step of adjusting the amount of water inside the polymerization system so as to achieve a state in which greater than 2.0 mol and not greater than 10 mol of water is present per 1 mol of the charged sulfur source, and continuing the polymerization reaction in a phase-separated state in which a thick phase of the produced polymer and a thin phase of the produced polymer are mixed inside the polymerization reaction system at a temperature of from 245 to 290° C.

As described above, the pre-stage polymerization step is a stage at which the conversion ratio of the dihalo aromatic compound reaches from 80 to 99%, preferably from 85 to 98%, and more preferably from 90 to 97% after the polymerization reaction has begun. If the polymerization temperature is set too high in the pre-stage polymerization step, side reactions or decomposition reactions may tend to occur easily.

The conversion ratio of the dihalo aromatic compound is a value calculated using the following formula. In the case where the dihalo aromatic compound (abbreviated as "DHA") is added in an excessive amount in terms of the molar ratio in comparison to the sulfur source, the conversion ratio is calculated by the following formula: conversion ratio=[[DHA charged amount (mol)−DHA residual amount (mol)]/[DHA charged amount (mol)−DHA excess amount (mol)]]×100. In other cases, the conversion ratio is calculated by the following formula: conversion ratio=[[DHA charged amount (mol)−DHA residual amount (mol)]/[DHA charged amount (mol)]]×100.

The amount of water present in the reaction system in the pre-stage polymerization step is ordinarily in the range of from 0.02 to 2.0 mol, preferably from 0.05 to 1.8 mol, more preferably from 0.5 to 1.6 mol, and particularly preferably from 0.8 to 1.5 mol per 1 mol of the charged sulfur source. The amount of water present in the pre-stage polymerization step may be small, but if the amount is excessively small, undesirable reactions such as the decomposition of the produced PAS may tend to occur easily. If the amount of water present exceeds 2.0 mol, the polymerization rate becomes very small or the decomposition of the organic amide solvent or the produced PAS tends to occur easily, both cases of which are not preferable. Polymerization is performed in a temperature range of from 170 to 270° C. and preferably from 180 to 265° C. If the polymerization temperature is too low, the polymerization rate becomes too low. Conversely, if the temperature reaches a high temperature exceeding 270° C., the produced PAS and the organic amide solvent tend to decompose, and the degree of polymerization of the produced PAS becomes very low.

In the pre-stage polymerization step, it is preferable to produce a polymer (prepolymer) having a melt viscosity of ordinarily from 0.5 to 30 Pa·s when measured at a temperature of 310° C. and a shearing rate of 1,216 sec$^{-1}$.

The post-stage polymerization step of the present invention is not simply a fractionation/granulation step for the polymer produced in the pre-stage polymerization step (also called a "prepolymer"), but is a step for inducing an increase in the degree of polymerization of the polymer.

In the post-stage polymerization step, it is preferable to add a phase separation agent (polymerization aid) to the polymerization system and to continue the polymerization reaction in a phase-separated state in which a thick phase of the produced polymer and a thin phase of the produced polymer are mixed.

In the post-stage polymerization step, it is preferable to use water as a phase separation agent. In a production method using water alone, the amount of water in the reaction system is preferably adjusted so that there is greater than 2.0 mol and not greater than 10 mol, preferably greater than 2.0 mol and not greater than 9 mol, more preferably from 2.1 to 8 mol, and particularly preferably from 2.2 to 7 mol of water present per 1 mol of the charged sulfur source. In the post-stage polymerization step, if the amount of water present in the reaction system is 2.0 mol or lower or greater than 10 mol per 1 mol of the charged sulfur source, the degree of polymerization of the produced PAS may decrease. In particular, if post-stage polymerization is performed while the amount of water present is in the range of from 2.2 to 7 mol, a PAS having a high degree of polymerization is easily obtained, which is preferable.

In a more preferable production method of the present invention, water and another phase separation agent other than water may be used in combination as phase separation agents in the post-stage polymerization step in order to perform polymerization with a small amount of phase separation agents. In this mode, the amount of water in the reaction system is adjusted to the range of greater than 2.0 mol and not greater than 10 mol, preferably greater than 2.0 and not greater than 9 mol, more preferably from 2.1 to 8 mol, and particularly preferably from 2.2 to 7 mol per 1 mol of the charged sulfur source, and the other phase separation agent other than water is added within the range of from 0.01 to 3 mol, preferably from 0.02 to 2 mol, and more preferably from 0.03 to 1 mol per 1 mol of the charged sulfur source. The other phase separation agent other than water used in the post-stage polymerization may be selected from an organic carboxylic acid metal salt such as sodium acetate, an organic sulfonic acid metal salt, an alkali metal halide such as halogenated lithium, an alkali earth metal halide, an alkali earth metal salt of an aromatic carboxylic acid, a phosphoric acid alkali metal salt, alcohols, or paraffin-based hydrocarbons.

The polymerization temperature in the post-stage polymerization step is in the range of from 245 to 290° C. If the polymerization temperature is lower than 245° C., a PAS having a high degree of polymerization is difficult to obtain. If the polymerization temperature exceeds 290° C., there is a risk that the produced PAS or the organic amide solvent may decompose. In particular, the temperature range of from 250 to 270° C. is preferable in that a PAS having a high degree of polymerization is easy to obtain.

Water may be added so as to increase the water content at a late stage or at the time of completion of the polymerization reaction with the objective of reducing the content of by-product alkali metal salts (for example, NaCl) or impurities in the produced polymer or to collect the polymer in a granular form. The polymerization reaction method may be a batch method, a continuous method, or a combined method of both methods. In batch polymerization, a method using two or more reaction vessels as necessary may be used with the objective of reducing the polymerization cycle time.

3. Separating and Collecting a Polymer, Step (II)

In the production method of the present invention, the separation and collection treatment of the PAS polymer produced by the polymerization reaction can be performed with the same method as in a separation step of a PAS polymer produced after an ordinary polymerization reaction. Step (II) of separating and collecting a polymer may comprise cooling a product slurry in the form of a reaction solution containing the produced PAS after the completion of the polymerization reaction, diluting the product slurry with water or the like as necessary, and then filtering the product slurry to separate and collect the produced PAS.

In addition, a production method for a PAS including a phase separation/polymerization step is preferable in that, because a granular PAS can be produced, such granular PAS can be easily separated from by-products, oligomers, or the like by separating the PAS from the reaction solution with a method of sieving the PAS using a screen. A PAS polymer may also be sieved from the product slurry in a high-temperature state without cooling the product to room temperature.

Further, a phase separation agent may be added so as to form a granular PAS prior to step (II) of separating and collecting a polymer, that is, at a late stage of step (I), immediately after the completion of step (I), or after the completion of step (I) and the granular PAS particles may be separated in step (II). At this time, step (I) may be performed in the presence or the absence of a phase separation agent. The added amount of the phase separation agent is as described above.

4. Washing, Step (III)

In order to minimize by-product alkali metal salts or oligomers in the PAS separated and collected by step (II) as much as possible, step (III) of washing may be performed, wherein the product is washed by bringing the product into contact with at least one type of washing solution selected from the group consisting of water, an organic solvent, and a mixed solution of water and an organic solvent. The present invention is characterized in that an aqueous medium is sprayed onto the PAS floating on the surface of the washing solution in the upper part of the inside of the washing vessel in step (III).

The organic solvent used in washing treatment is preferably the same organic amide solvent as the polymerization solvent or an organic solvent such as ketones (for example, acetone) or alcohols. One type of these may be used alone, or a plurality of types may be mixed and used. Acetone is preferable in that acetone has an excellent effect of removing impurities (low-molecular-weight components) such as oligomers or decomposition products. Acetone is also preferable from the perspective of economic efficiency or safety. If a plurality of types of organic solvents are mixed and used, it is preferable to use a mixed organic solvent including an acetone, in which the content of the acetone in the organic solvent is not less than 50 mass % and preferably not less than 70 mass %.

Deionized water, distilled water, ultrapure water, or the like can be used as the water used in washing treatment.

It is more preferable to use a mixed solution of water and acetone as a washing solution. As a mixed solution, it is preferable to use a mixture in which the proportion of water is preferably from 1 to 60 mass %, more preferably from 1 to 30 mass %, and particularly preferably from 1 to 20 mass % from the perspective of enhancing the removal efficiency of organic impurities such as oligomers or decomposition products.

Washing treatment with a washing solution is not limited to one time and may be performed more than once. Washing treatment is ordinarily performed from approximately 2 to approximately 4 times. The amount of the washing solution used in each washing is ordinarily from 1 to 15 times, preferably from 2 to 10 times, and more preferably from 3 to 8 times the volume of a theoretical PAS polymer (amount of the PAS polymer after water or an organic solvent is removed by drying or the like). The washing time is ordinarily from 1 to 120 minutes, preferably from 3 to 100 minutes, and more preferably from 5 to 60 minutes. If washing treatment using an organic solvent is performed, it is preferable to further perform washing treatment with water once or more than once in order to increase the removal efficiency of organic impurities and to remove inorganic salts such as NaCl.

Washing treatment is typically performed using a washing solution at room temperature (10 to 40° C.), but washing treatment may also be performed at a lower temperature or a higher temperature as long as the washing solution is in a liquid state. For example, hot water may be used as a washing solution in order to enhance the washing power of the water.

Batch washing and continuous washing are known as washing methods in step (III). Batch washing is a method of stirring and washing a collected polymer with a washing agent in a washing vessel. Continuous washing is a method of bringing a polymer in a wet state into contact with an organic solvent or water serving as a washing agent using counter current contact and/or concurrent contact. Continuous washing may be repeated, and batch washing may be performed prior to continuous washing. That is, step (III) of the present invention may be performed by combining a step of counter current washing and a step of batch washing or by combining with a step of continuous washing using concurrent contact.

[1] Washing a Slurry Using a Counter Current, Step (IIIa)

From the perspective of washing efficiency or energy efficiency, at least one of the steps of washings of the present invention is preferably step (IIIa) of washing a slurry using a counter current by transporting a slurry of the PAS polymer collected via step (II) from top to bottom and transporting the washing solution from bottom to top in the washing vessel so as to continuously bring the washing solution into contact with the slurry using a counter current, wherein an aqueous medium is preferably sprayed onto the PAS polymer floating on the surface of the washing solution in the upper part of the inside of the washing vessel in the step of washing using a counter current. If step (III) of washing a slurry is performed more than once in the production method for a PAS, all of repeated steps may be counter current washing (step (IIIa)), or some of the washing may be counter current washing (step (IIIa)). In addition, as described below, an aqueous medium may be sprayed onto the PAS floating on the surface of the washing solution in the upper part of the inside of the washing vessel in all of the counter current washing (step (IIIa)), or an aqueous medium may be sprayed onto the PAS floating on the surface of the washing solution in the upper part of the inside of the washing vessel in some of the counter current washing (step (IIIa)). It is preferable for an aqueous medium to be sprayed onto the PAS floating on the surface of the washing solution in the upper part of the inside of the washing vessel in all of the counter current washing (step (IIIa)). From the perspective of enhancing the product yield of the PAS or reducing the environmental load, it is preferable to employ a counter current washing of spraying an aqueous medium onto the PAS floating on the surface of the washing solution in the upper part of the inside of the washing vessel in the step of washing performed in the final stage.

If step (III) of the present invention includes step of counter current washing (IIIa), step (IIIa) is preferably performed using a counter current washing device comprising a washing vessel and an aqueous medium spraying unit. The washing device comprising an aqueous medium spraying unit for spraying an aqueous medium onto the PAS floating on the surface of the washing solution in the upper part of the inside of the washing vessel will be described in further detail hereinafter using a case in which an aqueous medium is sprayed onto the PAS floating on the surface of the washing solution in the upper part of the inside of the washing vessel in step (IIIa) of washing a slurry using a counter current, as an example.

The washing vessel used in step (IIIa) is not limited as long as the washing vessel can transport a slurry containing a PAS polymer from top to bottom due to the effect of gravity. In order to transport the slurry and the washing solution smoothly so as to efficiently perform counter current washing, it is possible to use a washing vessel having a roughly cylindrical shape erected in the vertical direction, that is, a washing column, or a washing vessel erected at an angle. It is preferable to use a washing column erected in the vertical direction in order to sufficiently exhibit the effect of submersing the floating polymer by spraying an aqueous medium onto the liquid surface from a nozzle or the like. The size of the washing vessel or washing column can be selected appropriately in accordance with the desired treatment amount. In the specific example described below, a device having an inside diameter of ordinarily from approximately 5 to approximately 50 cm, preferably from 10 to 40 cm, and more preferably from 15 to 35 cm and a length (height in the case of a washing column) of ordinarily from approximately 50 to approximately 300 cm, preferably from 80 to 250 cm, and more preferably from 100 to 200 cm is used. The size of the washing vessel or washing column can be changed in proportion to the treatment amount, that is, the amount fed per unit time of the slurry containing PAS particles and the washing solution.

In order to sufficiently achieve counter current contact between the slurry and the washing solution, a static mixer, a stirring blade, or a conveying screw is preferably provided inside the washing vessel, and the size and number thereof may be selected appropriately in accordance with the desired treatment amount.

The washing vessel comprises a top part, a main body part, and a base. A slurry feeding port for feeding a slurry is provided in the top part, and a polymer discharge port for discharging the slurry containing washed polymer particles is provided at the lower end of the base. A washing solution feeding port for feeding a washing solution, preferably an aqueous washing solution, is provided in the base, and at least a washing drainage discharge port for discharging the washing solution after the polymer particles are washed is also provided near the upper end of the top part. That is, the washing vessel of the present invention has a slurry feeding port, a polymer discharge port, a washing solution feeding port, and a washing drainage discharge port.

The FIGURE illustrates a schematic vertical cross-sectional view of an example of a washing column serving as a washing vessel for performing counter current washing. The washing column comprises a column top part 1, a main body part 2, and a column base 3. The main body part 2 is divided into five stirring chambers 21 to 25, and each stirring chamber is partitioned from one another by a partition plate 5 having an opening in the center. A stirring blade 6 is also provided in each of the stirring chambers 21 to 25. The stirring blades 6 are fixed to a common stirring shaft 7 passing through the column top part 1 and the main body 2, and can rotate.

A slurry feeding port 91 and a washing drainage discharge port 94 are provided in the column top part 1, and a washing solution feeding port 92 and a polymer discharge port 93 are provided in the column base 3. Two or more washing solution feeding ports for feeding a washing solution (preferably an aqueous washing solution) may also be provided as desired. In this example, the column top part 1 has a flow passage area expanded to approximately 1 to 4 times that of the main body part 2 in order to prevent the slurry containing PAS particles introduced from the slurry feeding port 91 from being subjected to back mixing in the axial direction due to the liquid flow discharged from the washing drainage discharge port 94. In addition, a nozzle 4 for spraying water serving as an aqueous medium is provided in the column top part 1.

In a counter current washing device with such a configuration, a slurry containing PAS particles introduced into the column top part 1 from the slurry feeding port 91 is introduced into the first stirring chamber 21 and drops down while being stirred by a stirring blade 6 disposed below the stirring chamber 21. On the other hand, the upward flow of a washing solution, preferably an aqueous washing solution, introduced from the washing solution feeding port 92 is mixed with the slurry introduced from above the stirring blade 6 while being stirred by the stirring blade 6. The counter current contact between the slurry and the washing solution proceeds in the stirring chamber 21 as a result of this series of fluid actions. Similarly, counter current contact proceeds while the components are successively mixed by stirring in the stirring chambers 22 to 25 as well, and counter current washing is achieved as a result.

The supplied amount of the slurry containing PAS particles and the supplied amount of the washing solution, preferably an aqueous washing solution, can be adjusted appropriately while taking into consideration the size of the washing vessel, the stirring speed of the stirring blades, the washing bath ratio determined by the mass ratio of PAS in the washing solution and the slurry, the estimated content of impurities or the like, the temperature of the slurry containing PAS particles and the washing solution, the average contact time between the slurry containing PAS particles and the washing solution, and the like. The supplied amount of the washing solution, preferably an aqueous washing solution, can be set to a wide range of supplied amounts in the range of ordinarily from 0.5 to 800 kg/hr, preferably from 1 to 700 kg/hr, and more preferably from 1.5 to 600 kg/hr, which is efficient. In addition, the supplied amount of the washing solution may be set so that the washing bath ratio is ordinarily in the range of from 1 to 20, preferably from 1 to 15, more preferably from 1 to 10, even more preferably from 1 to 5, particularly preferably from 1 to 3, and most preferably from approximately 1.5 to approximately 2.5.

The temperature of the slurry containing PAS particles fed to the washing vessel is ordinarily in the range of from 20 to 70° C., and the temperature of the washing solution, preferably an aqueous washing solution, is ordinarily in the range of from 15 to 40° C. If the counter current contact efficiency is good, the temperature of the washing drainage ordinarily becomes low. The supplied amount of the slurry containing PAS particles and the supplied amount of the washing solution may be adjusted so that the temperature of the washing solution at the washing drainage discharge port is in the range of from 20 to 50° C. If the temperature of the washing solution at the washing drainage discharge port is too high, the heat loss becomes large, and the amount of gas generated from the slurry increases, resulting in a further increase in floating polymer generation. The temperature is preferably set in the range of from 15 to 45° C. and more preferably from 20 to 40° C.

[2] Aqueous Medium Spraying

In step (III) of washing a slurry, specifically, step (IIIa) of washing a slurry using a counter current, of the present invention, an aqueous medium is sprayed onto the PAS particles floating on the surface S of the washing solution in the upper part of the inside of the washing vessel. Therefore, the counter current washing device comprising an aqueous medium spraying unit used in step (IIIa) has a washing vessel as well as a spraying unit for spraying an aqueous medium connected to the top part of the washing vessel.

The spraying unit for spraying an aqueous medium is not particularly limited as long as the spraying unit can spray the aqueous medium in the form of a shower on the surface S of the washing solution in the upper part of the inside of the washing vessel, but it is simplest to attach a nozzle to the top part of the washing vessel.

In step (IIIa), the degree of discharge of dissolved oxygen or dissolved air contained in the washing solution or the sedimentation rate of the particles varies depending on the composition and temperature of the slurry containing PAS particles and the composition and temperature of the washing solution. As a result, a gas adsorbs onto the surface of the PAS particles floating in the upper part of the inside of the washing vessel, and a floating polymer thus floats on the upper surface of the washing solution, that is, the surface S of the washing solution, in the upper part of the inside of the washing vessel. If an aqueous medium is sprayed onto the liquid surface from a nozzle or the like in the form of a shower, the gas adsorbed onto the surface of the polymer particles of the generated floating polymer floating on the surface S of the washing solution in the upper part of the inside of the washing vessel is separated and eliminated. As a result, the buoyancy with respect to the PAS particles originating from the gas adsorbed onto the surface is lost, and the floating polymer is reduced. The PAS particles are sedimented due to gravity based on the original specific gravity thereof while making contact with the aqueous washing solution due to a counter current, and the PAS particles are then discharged from the polymer discharge port and collected in the product as a produced polymer. Consequently, the floating polymer floating on the liquid surface is prevented from being discharged to the outside of the washing vessel together with the washing drainage.

If step (III) of washing a slurry is repeated more than once in the production method for a PAS, all of the washing may be step (IIIa) of washing a slurry using a counter current, or some of washing may be step (IIIa), and a combination of batch washing and, in some cases, a continuous washing using concurrent contact may also be used. In addition, an aqueous medium may be sprayed onto the PAS floating on the surface of the washing solution in the upper part of the inside of the washing vessel in all of steps (III) of washing, or an aqueous medium may be sprayed onto the PAS floating on the surface of the washing solution in the upper part of the inside of the washing vessel in some of steps (III). It is preferable for an aqueous medium to be sprayed onto the PAS floating on the surface of the washing solution in the upper part of the inside of the washing vessel in all of steps (III). From the perspective of enhancing the product yield of the PAS or reducing the environmental load, it is preferable to spray an aqueous medium onto the PAS floating on the surface of the washing solution in the upper part of the inside of the washing vessel in washing performed in the final stage, and it is more preferable to employ washing a slurry using a counter current for washing performed in the final stage.

[3] Aqueous Medium

Water or a mixed solvent of water and a liquid such as an alcohol which has an affinity with water is used as the aqueous medium sprayed from the nozzle. The composition may be the same as or different than that of the washing solution, but water is preferably used due to the ease of handling. Deionized water, distilled water, ultrapure water, or the like can be used as the water.

The aqueous medium sprayed from the nozzle is discharged from the washing drainage discharge port while mixed with the washing solution. The amount of the aqueous medium sprayed from the nozzle is within the range of from 1 to 20%, preferably from 2 to 19%, more preferably from 3 to 18%, and particularly preferably from 4 to 17% of the supplied amount of the washing solution (aqueous washing solution) so as to achieve an effect of separating and eliminating any gas adsorbed onto the surface of the polymer particles of the floating polymer generated on the liquid surface. The aqueous medium sprayed from the nozzle is discharged from the washing drainage discharge port in a state in which almost all of the aqueous medium is mixed with the washing solution, but since the amount is small in comparison to the supplied amount of the washing solution, the liquid amount discharged from the washing drainage discharge port, that is, the amount of overflow, does not increase substantially as a result of spraying the aqueous medium from the nozzle. As described above, if an aqueous medium is not sprayed from the nozzle, a floating polymer is discharged together with the washing solution, and the amount of overflow is large as a result. In contrast, in the present invention, the amount of a floating polymer discharged from the washing drainage discharge port decreases substantially if an aqueous medium is sprayed from the nozzle. The amount of overflow also depends on the supplied amount of the washing solution but can be reduced to the range of from approximately 0.05 to approximately 40 kg/hr, preferably from approximately 0.05 to approximately 30 kg/hr, more preferably from approximately 0.05 to approximately 25 kg/hr, and even more preferably from approximately 0.05 to approximately 20 kg/hr.

In addition, if applying a shower of the aqueous medium in the present invention, the supplied amount of the washing solution required to perform washing using counter current contact may be small, which makes it possible to perform washing without any waste using a relatively small amount of a washing solution. As described above, the supplied amount of the washing solution can be reduced to particularly preferably from 1 to 3 and most preferably from approximately 1.5 to approximately 2.5 in terms of the washing bath ratio.

The temperature of the aqueous medium sprayed from the nozzle is not particularly limited but is ordinarily in the range of from 5 to 50° C., preferably from 10 to 40° C., and more preferably from 15 to 30° C., and the temperature may be so-called room temperature.

If the temperature of the aqueous medium is too high, the gas adsorbed onto the surface of the polymer particles may expand and increase the buoyancy, or dissolved oxygen in the slurry or air or the like incorporated into the liquid phase inside the washing vessel may float up as a gas and once again adsorbed onto the surface of the polymer particles. On the other hand, if the temperature of the aqueous medium is too low, it becomes difficult to separate and eliminate the gas adsorbed onto the surface of the polymer particles.

In step (IIIa), washing a slurry using a counter current, of the present invention, the spraying of an aqueous medium onto the polymer floating on the surface of the washing solution is performed from a nozzle device connected to the top part of the washing vessel, but this may also be performed by combining a method of allowing an aqueous medium to flow out as a small parallel flow to a degree that the aqueous medium touches the liquid surface from another feeding port provided in the treatment vessel in addition to spraying from the nozzle device as necessary.

The nozzle for spraying the aqueous medium is not limited with regard to the nozzle shape, the number of nuzzles, the nozzle mechanism, the nozzle arrangement, or the like as long as the nozzle device is one that sprays an aqueous medium from above the washing vessel and can achieve an effect of separating and eliminating a gas adsorbed onto the surface of polymer particles in a floating polymer generated on the liquid surface. That is, the contour of the opening of the nozzle may be circular, elliptical, star-shaped, cross-shaped, or the like, and a nozzle having one or a plurality, specifically, from approximately 2 to approximately 6, of these openings at the tip of the nozzle may be used. The nozzle device of the present invention may have nozzles at one or a plurality of locations, specifically, from 2 to 10 locations, on the device. If nozzles are provided at a plurality of locations, the nozzles may be arranged regularly with linear symmetry, point symmetry, or the like, or the nozzles may arranged irregularly within a range that makes it possible to achieve the desired effect. Further, the nozzle device of the present invention may have a mobile nozzle, and a wide variety of nozzles may be used, such as a swivelable nozzle having a nozzle swiveling device, a nozzle capable of moving linearly, a nozzle capable of moving along a curve, or a nozzle which performs spraying intermittently. If a mobile nozzle is provided, a sufficient effect can be achieved by providing nozzles at 1 to 3 locations, which makes it possible to simplify the structure of the washing device. These nozzles need to be able to spray the aqueous medium onto the liquid surface, so the nozzles are provided further above the column top part in the schematic cross-sectional view of the washing column of the FIGURE, but the nozzles may also be attached so that the openings of the nozzles face downward on the inside surface of a lid provided on the column top part.

A PAS is separated using a screen, a centrifuge, or the like from a slurry containing the PAS discharged from the polymer discharge port 93 by performing washing treatment in step (IIIa) of washing a slurry using a counter current. If filtration is performed using a screen, a wet cake of a PAS polymer having a liquid content of ordinarily from 30 to 75 mass % and, in many cases, from approximately 40 to approximately 65 mass % is obtained. A wet cake having a low liquid content may also be formed using a centrifuge. The wet cake may or may not be washed further with water or the like, and a PAS is separated by filtration.

5. Treating a Slurry with Acid Using a Counter Current, Step (IIIb)

[1] Acid Treatment

The production method for a PAS according to the present invention may be a production method including step (IIIb) between step (IIIa) and step (IV) as desired:

(IIIb) treating a slurry with acid using a counter current by: transporting a slurry of the polymer containing an acidic compound, from top to bottom, the slurry of the polymer collected via step (IIIa); and transporting an aqueous washing solution from bottom to top in the washing vessel; so as to continuously bring the aqueous washing solution into contact with the slurry using a counter current;

wherein an aqueous medium is sprayed onto the PAS floating on the surface of the washing solution (including the "surface of an aqueous washing solution") in the upper part of the inside of the washing vessel in at least one of steps (IIIa) or (IIIb). That is, in the production method for a PAS according to the present invention, it is preferable to perform acid treatment in step (IIIb) in addition to counter current washing in step (III).

In the production method for a PAS according to the present invention, impurities such as water-soluble metal salts can be completely removed by treating (acid-treating) the washed PAS with an acidic compound, and the crystallization properties such as the degree of crystallinity or the crystallization rate, the thermal decomposition stability, and the like can be enhanced by removing basic residues at the terminals of the polymer chains of the PAS. The acid treatment step can be performed before or after step (III) described above, but the acid treatment step is preferably performed after step (III), specifically, immediately after step (III), since the effect of acid treatment can be enhanced by reducing the residual amount of impurities, oligomers, or the like in advance. In the production method for a PAS according to the present invention, it is preferable to perform the acid treatment step between the aforementioned step (IIIa) of washing a slurry using a counter current and step (IV) of collecting the polymer after washing.

The acidic compound used to perform acid treatment is not particularly limited as long as the acidic compound is capable of removing impurities such as water-soluble metal salts and removing basic residues such as—SNa at the terminals of the polymer chains of the PAS. Examples include organic acids including saturated fatty acids such as formic acid, acetic acid, propionic acid, butyric acid, valeric acid, and caproic acid; unsaturated fatty acids such as acrylic acid, crotonic acid, and oleic acid; aromatic carboxylic acids such as benzoic acid, phthalic acid, and salicylic acid; dicarboxylic acids such as oxalic acid, maleic acid, and fumaric acid; sulfonic acids such as methane sulfonic acid and p-toluenesulfonic acid; and inorganic acids such as hydrochloric acid, nitric acid, sulfuric acid, and phosphoric acid. Particularly preferable are acetic acid and hydrochloric acid.

In order to perform acid treatment, a slurry containing an acidic compound is prepared, for example, by adding an acetic acid aqueous solution having a concentration of from 1 to 80 mass %, preferably from 3 to 60 mass %, and more preferably from 5 to 40 mass % as an aqueous solution of an acidic compound to a PAS in the form of a wet cake or a PAS slurry as an aqueous dispersion of a PAS. Acid treatment proceeds efficiently if the amount of the polymer in the slurry containing the acidic compound is in the range of ordinarily from 0.5 to 25 mass %, preferably from 1 to 20 mass %, and more preferably from 2 to 15 mass %. Deionized water, distilled water, ultrapure water, or the like can be used as the water used to obtain an aqueous solution of the acidic compound. The pH of the slurry containing the acidic compound needs to be at least be less than 7 and is more preferably in the range of from pH 2 to 6.

[2] Counter Current Contact with Aqueous Washing Solution

The acid treatment step of the production method for a PAS according to the present invention preferably includes step (IIIb) of treating a slurry with acid using a counter current by transporting a slurry of the PAS, collected via step (III) and containing an acidic compound, downward and transporting an aqueous washing solution upward in the washing vessel so as to continuously come into contact with the slurry using a counter current, and step (IIIb) is preferably a step of treating a slurry with acid using a counter current, in which an aqueous medium is sprayed onto the PAS floating on the surface of the washing solution in the upper part of the inside of the washing vessel.

That is, if the production method for a PAS includes step (IIIb), an aqueous medium may be sprayed onto the PAS floating on the surface of the washing solution in the upper part of the inside of the washing vessel in the previous step (IIIa), and/or step (IIIb). Specifically, it is possible to use a method of spraying an aqueous medium in both step (IIIa) and step (IIIb), treating a slurry with acid using a counter current, a method of spraying an aqueous medium only in step (IIIa), or a method of spraying an aqueous medium only in step (IIIb). The production apparatus for a PAS provided with a counter current washing device and a counter current contact/acid treatment device in order to implement these methods may be a device having an aqueous medium spraying unit in both the counter current washing device and the counter current contact/acid treatment device, a device having an aqueous medium spraying unit only in the counter current washing device, or a device having an aqueous medium spraying unit only in the counter current contact/acid treatment device.

In the present invention, it is unnecessary to perform washing separately in order to remove acid components originating from the acidic compound after acid treatment is performed, so a method of transporting the slurry containing the acidic compound from top to bottom and transporting the aqueous washing solution from bottom to top in the washing vessel so as to continuously bring the aqueous washing solution into contact with the slurry using a counter current may be used as the acid treatment method. Washing with water may also be performed as necessary after acid treatment.

The washing vessel used in step (IIIb) is not limited as long as the washing vessel can transport a slurry containing an acidic compound from top to bottom due to the effect of gravity. In order to move the slurry containing the acidic compound and the washing solution smoothly so as to efficiently proceed counter current contact/acid treatment, it is possible to use a washing vessel having a substantially cylindrical shape erected in the vertical direction, that is, a washing column, or a washing vessel erected at an angle. It is preferable to use a washing column erected in the vertical direction in order to sufficiently exhibit the effect of submersing the floating polymer by spraying an aqueous medium onto the liquid surface from a nozzle or the like. The size of the washing vessel or washing column can be selected appropriately in accordance with the desired treatment amount.

In order to sufficiently achieve counter current contact between the slurry and the aqueous washing solution, a static mixer, a stirring blade, or a conveying screw is preferably provided inside the washing vessel, and the size and number thereof may be selected appropriately in accordance with the desired treatment amount.

The washing vessel of the counter current contact/acid treatment device comprises a top part, a main body part, and a base. A slurry feeding port for feeding a slurry is provided in the top part, and a polymer discharge port for discharging the slurry containing acid-treated polymer particles is provided at the lower end of the base. An aqueous washing solution feeding port for feeding an aqueous washing solution is provided in the base, and at least a washing drainage discharge port for discharging the washing solution after the polymer particles are acid-treated is also provided near the upper end of the top part. That is, the washing vessel of the counter current contact/acid treatment device of the present invention has a slurry feeding port, a polymer discharge port, an aqueous washing solution feeding port, and a washing drainage discharge port.

The washing column serving as a washing vessel for performing counter current contact/acid treatment may be the same device as the washing column used to perform counter current washing, an example of which is illustrated in the schematic vertical cross-sectional view of the FIGURE. (It should be noted that the washing solution feeding port is used as an aqueous washing solution feeding port.) This will be described hereinafter with reference to the washing column used to perform counter current washing illustrated in FIG. 1.

The washing column comprises a column top part 1, a main body part 2, and a column base 3. The main body part 2 is divided into five stirring chambers 21 to 25, and each stirring chamber is partitioned from one another by a partition plate 5 having an opening in the center. A stirring blade 6 is also provided in each of the stirring chambers 21 to 25. The stirring blades 6 are fixed to a common stirring shaft 7 passing through the column top part 1 and the main body 2, and can rotate.

A slurry feeding port 91 and a washing drainage discharge port 94 are provided in the column top part 1, and an aqueous washing solution feeding port 92 and a polymer discharge port 93 are provided in the column base 3. In this example, the column top part 1 has a flow passage area expanded to approximately 1 to 4 times that of the main body part 2 in order to prevent the slurry containing the acidic compound and PAS particles introduced from the slurry feeding port 91 from being subjected to back mixing in the axial direction due to the liquid flow discharged from the washing drainage discharge port 94. In addition, a nozzle 4 for spraying water serving as an aqueous medium is provided in the column top part 1.

In a device with such a configuration, a slurry containing an acidic compound and PAS particles introduced into the column top part 1 from the slurry feeding port 91 is introduced into the first stirring chamber 21 and drops down while being stirred by a stirring blade 6 disposed below the stirring chamber 21. On the other hand, the upward flow of an aqueous washing solution introduced from the aqueous washing solution feeding port 92 is mixed with the slurry introduced from above the stirring blade 6 while being stirred by the stirring blade 6. The counter current contact between the slurry and the aqueous washing solution proceeds in the stirring chamber 21 as a result of this series of fluid actions. Similarly, counter current contact proceeds while the components are successively mixed by stirring in the stirring chambers 22 to 25 as well.

The slurry containing the acidic compound may be prepared outside or inside the washing vessel. If prepared outside the washing vessel, a slurry containing an acidic compound is prepared from an aqueous solution of an acidic compound and a polymer in a wet cake state or an aqueous dispersion of a polymer inside a re-slurry vessel connected to the washing vessel, and the slurry is then fed into the washing vessel from the slurry feeding port. If prepared inside the washing vessel, an acidic compound feeding port for feeding an aqueous solution of an acidic compound is provided slightly below the slurry feeding port for feeding a slurry in the washing vessel, for example, and a slurry containing an acidic compound is prepared by mixing an acidic compound and a slurry inside the washing vessel.

Water or a mixed solvent of water and a liquid such as an alcohol having an affinity with water is used as the aqueous washing solution, but water is preferably used because it is unnecessary to separate the components of the washing drainage after collection. Deionized water, distilled water, ultrapure water, or the like can be used as the water. Two or more aqueous washing solution feeding ports for feeding an aqueous washing solution may also be provided as desired.

The supplied amount of the slurry containing the acidic compound and the supplied amount of the aqueous washing solution can be adjusted appropriately while taking into consideration the size of the washing vessel, the stirring speed of the stirring blades, the washing bath ratio determined by the mass ratio of PAS particles in the aqueous washing solution and the slurry, the estimated content of impurities or the like, the temperature of the slurry containing acidic compound and the aqueous washing solution, the average contact time between the slurry containing the acidic compound and the aqueous washing solution, and the like. The supplied amount of the aqueous washing solution can be set to a wide range of supplied amounts in the range of ordinarily from 0.5 to 800 kg/hr, preferably from 1 to 700 kg/hr, and more preferably from 1.5 to 600 kg/hr, which is efficient. In addition, the supplied amount of the aqueous washing solution may be set so that the washing bath ratio is ordinarily in the range of from 1 to 20, preferably from 1 to 15, more preferably from 1 to 10, even more preferably from 1 to 5, particularly preferably from 1 to 3, and most preferably from approximately 1.5 to approximately 2.5. If the supplied amount of the aqueous washing solution is too large, the acidic compound is immediately diluted, and the polymer particles cannot be sufficiently acid-treated. If the supplied amount of the aqueous washing solution is too small, the acidic compound remains in the slurry containing polymer particles discharged from the polymer discharge port, thus a step of removing the acidic compound by further washing with water may become necessary.

The temperature of the slurry containing the acidic compound fed to the washing vessel is ordinarily in the range of from 20 to 70° C., and the temperature of the aqueous washing solution is ordinarily in the range of from 15 to 40° C. The temperature of the washing drainage ordinarily is lower if the counter current contact efficiency is better. The supplied amount of the slurry containing the acidic compound and the supplied amount of the aqueous washing solution may be adjusted so that the temperature of the washing solution at the washing drainage discharge port is in the range of from 20 to 50° C. If the temperature of the washing solution at the washing drainage discharge port is too high, the heat loss becomes large, and the amount of gas generated from the slurry increases, resulting in a further increase in floating polymer generation. The temperature is preferably set in the range of from 15 to 45° C. and more preferably from 20 to 40° C.

[3] Aqueous Medium Spraying

In step (IIIb) of treating a slurry with acid using a counter current of the present invention, an aqueous medium is sprayed onto the PAS floating on the surface S of the washing solution in the upper part of the inside of the washing vessel (the surface S of the aqueous washing solution in step (IIIb)). Therefore, the counter current contact/acid treatment device used in step (IIIb) of the present invention comprises the washing vessel described above as well as a spraying unit for spraying an aqueous medium connected to the top part of the washing vessel.

The aqueous medium spraying unit for spraying an aqueous medium is not particularly limited as long as the spraying unit can spray the aqueous medium in the form of a shower on the surface S of the aqueous washing solution in the upper part of the inside of the washing vessel, but it is simplest to attach a nozzle to the top part of the washing vessel. That is, the same spraying unit as the spraying unit for an aqueous medium described for the counter current washing device may be used, and the nozzle shape, the number of nuzzles, the nozzle mechanism, the nozzle arrangement, the type of the aqueous medium sprayed from the nozzle, the amount of the aqueous medium sprayed from the nozzle, the temperature of the aqueous medium, and the like can be selected and adjusted in the same manner as in step (IIIa).

In step (IIIb) of treating a slurry with acid using a counter current as well, the spraying of an aqueous medium onto the PAS particles floating on the surface of the aqueous washing solution may also be performed by combining a method of allowing an aqueous medium to flow out as a small parallel flow to a degree that the aqueous medium touches the liquid surface from another feeding port provided in the treatment vessel in addition to dispersion from the nozzle device as necessary.

Note that step (IIIb), treating a slurry with acid using a counter current, with spraying an aqueous medium onto the PAS floating on the surface of the aqueous washing solution in the upper part of the inside of the washing vessel in the present invention does not necessarily need to be performed together with step (IIIa), washing a slurry using a counter current, with spraying an aqueous medium onto the PAS floating on the surface of the washing solution in the upper part of the inside of the washing vessel and may also be performed in combination with one or a plurality of other washing methods other than said washing of a slurry using a counter current. Therefore, the counter current contact/acid treatment device having an aqueous medium spraying unit in the present invention does not need to be used together with the counter current washing device having an aqueous medium according to the present invention and may also be used after being connected to one or a plurality of other washing devices other than the counter current washing device having an aqueous medium spraying unit according to the present invention. At this time, a slurry containing an acidic compound may be prepared from an aqueous solution of an acidic compound and a polymer in a wet cake state or an aqueous dispersion of a polymer inside a re-slurry vessel connected to the washing vessel of the counter current contact/acid treatment device having an aqueous medium spraying unit according to the present invention, and the slurry may then be fed into the washing vessel from the slurry feeding port. In addition, in the washing vessel of the counter current contact/acid treatment having an aqueous medium spraying unit according to the present invention, an acidic compound feeding port for feeding an aqueous solution of an acidic compound may be provided slightly below the slurry feeding port for feeding a slurry, and a slurry containing an acidic compound may be prepared by mixing an acidic compound and a slurry inside the washing vessel.

It is ordinarily sufficient for step (IIIa), washing a slurry using a counter current, and/or step (IIIb), treating a slurry with acid using a counter current, of the present invention to be performed once in the production method for a PAS, but the steps may also be repeated more than once, such as 2 or 3 times, for example. If step (IIIa) or step (IIIb) is performed repeatedly, it is preferable to arrange an array of plurality of counter current washing devices or counter current contact/acid treatment devices having aqueous medium spraying unit according to the present invention.

Step (IIIa), washing a slurry using a counter current, and/or step (IIIb), treating a slurry with acid using a counter current, of the present invention has the substantial feature that PASs collected as products can be used as the same product lot. Conventionally, most products collected from production processes and, in particular, products collected in various steps from the perspective of environmental load or the like entail a risk of differences in product quality, in particular, the melt viscosity of the PAS, which is closely related to moldability, particle size, or particle size distribution, and contamination due to the immixing of foreign matter, so the latter collected products could not be prepared as products previously, but there is no such problem if produced via step (IIIa) of washing a slurry using a counter current and, if desired, step (IIIb) of treating a slurry with acid using a counter current of the present invention, and this yields a substantial merit from the perspective of production.

6. Collecting PAS Particles, Step (IV)

The PAS particles subjected to washing treatment and acid treatment are separated from the slurry containing polymer particles using a screen, a centrifuge, or the like. If filtration is performed using a screen, a wet cake of PAS polymer particles having a liquid content of ordinarily from 30 to 75 mass % and, in many cases, from approximately 40 to approximately 65 mass % is obtained. A wet cake having a low liquid content may also be formed using a centrifuge. The wet cake may or may not be washed further with water or the like as necessary, and the wet cake is then dried to collect the produced PAS polymer particles.

7. Re-Separating a PAS Particle, Step (V)

The production method for a PAS according to the present invention may further include the following step (V) of re-separating a PAS particles by feeding the washing drainage discharged from the washing vessel to a PAS particle re-separation unit loaded with a filter so as to capture PAS particles and then re-separate and discharge the PAS particles from the filter. In addition, the production method for a PAS according to the present invention may be a production method for a PAS in which the step (V) of PAS particle re-separation is repeatedly performed more than once.

That is, in addition to the drainage of the washing solution obtained after the PAS particles in the slurry containing the PAS particles, the washing drainage discharged from the washing vessel via the step (III) may also contain PAS particles that could not be sedimented even by contact with the washing solution, for example, the upward flow (upflow) of the washing solution in step (IIIa), together with a water-soluble inorganic substance, an acidic compound, and the like.

Because the production method for a PAS according to the present invention includes step (V), it is possible to re-separate and collect PAS particles discharged together with the washing drainage.

The PAS particle re-separation unit loaded with a filter for the purpose of performing step (V) is not particularly limited as long as the PAS particle re-separation unit can capture PAS particles discharged together with the washing drainage with high efficiency and then re-separate and discharge the PAS particles from the filter. Preferably, a PAS particle re-separation device having a PAS particle capturing unit to which a washing drainage discharged from the washing vessel is fed, the PAS particle capturing unit being loaded with a filter for capturing PAS particles, and a backwash unit for re-separating and discharging PAS particles from the filter is used. For example, the PAS particle re-separation device may be selected with reference to WO/2012/008340. A microslit filter, for example, may be used as the filter loaded into the PAS particle capturing unit. A microslit filter is a filter having a form in which slit-shaped through-holes are disposed in a wrapping manner around a tube by strongly wrapping a wire around a stainless steel corrugated polygonal tube. Known microslit filters includes an MS filter (manufactured by Totoku Electric Co., Ltd.). In addition, the backwash unit blows a backwash fluid preferably comprising the washing solution and a compressed gas (compressed air, compressed nitrogen, or the like) onto the filter such as a microslit filter loaded into the PAS particle capturing unit so as to discharge the PAS particles.

The PAS particles discharged together with the backwash fluid are separated from the backwash fluid by a method which is itself publicly known, and the PAS particles are then washed as necessary and re-separated by filtration. The re-separated PAS particles may be fed to step (IV) or may be further washed or dried as necessary and mixed with the PAS particles collected in step (IV) so as to form a product. By including step (V), the production method for a PAS according to the present invention exhibits the effect that the product yield improves and that purification treatment of the washing drainage also becomes unnecessary.

8. Polyarylene Sulfide

The PAS obtained by the production method for a PAS according to the present invention is sufficiently washed in the step (III) of washing a slurry and is further sufficiently acid-treated as necessary, so the content of a malodorous component is very low.

In addition, if the PAS obtained by the production method for a PAS according to the present invention uses pDCB as a dihalo aromatic compound, the dihalo aromatic content remaining in the polymer can ordinarily be set to not greater than 500 ppm (mg/kg-PAS), preferably not greater than 400 ppm, and more preferably not greater than 350 ppm.

With the production method for a PAS according to the present invention, it is possible to obtain a PAS having a melt viscosity of ordinarily from 1 to 100 Pa·s, preferably from 2 to 80 Pa·s, and particularly preferably from 3 to 70 Pa·s when measured at a temperature of 310° C. and a shearing rate of 1,216 sec$^{-1}$. With the production method for a PAS according to the present invention, it is possible to obtain a weight average molecular weight of ordinarily from 10,000 to 300,000, preferably from 13,000 to 200,000, and particularly preferably from 14,000 to 100,000.

With the production method for a PAS according to the present invention, it is possible to collect a dried granular polymer captured with a screen having a mesh size of 150 µm (100 mesh) with a yield of ordinarily from 85 to 99%, preferably from 88 to 99%, and particularly preferably from 90 to 98%. With the production method for a PAS according to the present invention, it is possible to obtain a granular PAS having an average particle size (average particle size measured with a laser diffraction particle size distribution analyzer) of from 160 to 1,000 µm, preferably from 170 to 800 µm, and more preferably from 200 to 700 µm. In addition, with the production method for a PAS according to the present invention, it is possible to obtain a granular PAS having a specific surface area of from 0.1 to 500 $m^2/g$, preferably from 1 to 200 $m^2/g$, and more preferably from 3 to 80 $m^2/g$ as measured with a BET method using nitrogen adsorption. Therefore a granular PAS having excellent handling properties is obtained.

EXAMPLES

The present invention will be described in further detail hereinafter using working examples and a comparative example, but the present invention is not limited to these working examples alone.

Working Example 1

(Step (A), Dehydrating a Mixture)
First, 6,004 g of NMP, 2,000 g of a sodium hydrosulfide aqueous solution (NaSH; concentration: 62 mass %; containing 28 g of $Na_2S$), and 1,191 g of sodium hydroxide (NaOH; concentration: 74 mass %) were charged into a 20-liter autoclave. The molar ratio of sodium hydroxide to the sulfur source (NaOH/S) was 0.997, and the molar ratio of NaOH/NaSH was 1.012. The sodium hydrosulfide and sodium hydroxide at each of these concentrations contain water such as aqueous water as a residual component.

After the inside of the autoclave was purged with a nitrogen gas, the inside of the autoclave was gradually heated to 200° C. over the course of approximately four hours while stirring at a revolution speed of 250 rpm of a stirrer so as to distill out 1,006 g of water ($H_2O$), 1,287 g of NMP, and 12 g of hydrogen sulfide ($H_2S$).

(Step (I), Performing Polymerization)
After step (A) of dehydrating a mixture, the contents of the autoclave were cooled to 150° C., and 3,380 g of pDCB, 3,456 g of NMP, 19.29 g of sodium hydroxide (high-purity product), and 149 g of ion-exchanged water were added. The ratio (g/mol) of NMP to the charged sulfur source (abbreviated as the "charged S" hereafter) in the drum was 375. The ratio of pDCB to the charged (mol/mol) was 1.060. The ratio of $H_2O$ to the charged S (mol/mol) was 1.50. The ratio of NaOH to the charged S (mol/mol) was 1.060.

The contents of the autoclave were reacted for three hours at a temperature of 220° C. while stirring at a revolution speed of 250 rpm of the stirrer so as to perform pre-stage polymerization. The conversion rate of the pDCB was 91%.

After the completion of pre-stage polymerization, the revolution speed of the stirrer was increased to 400 rpm, and 444 g of ion-exchanged water was pressed into the contents while the contents of the autoclave were stirred. The ratio of $H_2O$ to the charged S (mol/mol) was 2.63. After charging of ion-exchanged water under pressure, the contents were heated to 255° C. and reacted for four hours so as to perform post-stage polymerization. The conversion rate of the pDCB was 95%.

(Step (II), Separating and Collecting a Polymer)
After the completion of post-stage polymerization, the contents were cooled to around room temperature and sieved with a screen having a mesh size of 150 µm. A granular polymer was thus separated and collected, and a wet cake (water content: 60%) was obtained.

(Batch Washing Treatment Step)
A mixed solution of ion-exchanged water and acetone was added as a washing solution to the wet cake of the separated granular polymer, and the wet cake was washed for 30 minutes while stirring. The amount of the washing solution is 5 times the amount of the theoretical collected amount of the polymer (amount of polymer in the wet cake), and the water content of the washing solution is 5 mass %. After this washing was performed 3 times, washing while stirring was performed 3 times for 20 minutes each using ion-exchanged water as a washing solution. Each washing described above was performed after setting the liquid temperature of the washing solution to room temperature. After washing, the polymer was separated and collected so as to obtain a wet cake.

(Step (IIIa), Washing a Slurry Using a Counter Current)
In order to remove acetone remaining in the wet cake after the batch washing treatment step, ion-exchanged water was added to the wet cake to form a slurry, and step (IIIa) was performed on the granular slurry using a washing column having one swivelable nozzle in roughly the center of the column top part illustrated in the FIGURE as a washing vessel.

That is, counter current washing was performed by feeding a slurry of the PAS polymer at a rate of 50.0 kg/hr from the slurry feeding port 91 and ion-exchanged water serving as a washing solution at a rate of 10.0 kg/hr from the washing solution feeding port 92 so as to continuously bring the slurry of the PAS polymer and the ion-exchanged water into contact for one hour using a counter current. The washing bath ratio was 2. Ion-exchanged water was sprayed toward from the nozzle toward the surface S of the washing solution at 10 g/min (0.6 kg/hr).

The discharge rate of the washing drainage discharged from the washing drainage discharge port 94 was 15.0 kg/hr. No floating polymer of PAS was observed in the washing drainage. In addition, the amount of the slurry containing the PAS polymer particles discharged from the polymer discharge port 93 was 45.6 kg/hr.

(Step (IV), Collecting the Polymer After Washing,)
The slurry containing the PAS polymer particles was dried to collect the polymer particles. When the polymer particles were weighed, the amount of the PAS per one hour of the step (IIIa) was 4.76 kg (product yield: 95.2%), and the average particle size of the obtained particles was 230 µm. The results are shown in Table 1.

Working Example 2

Treatment was performed in the same manner as in Working Example 1 with the exception that step (IIIa) was modified as follows.

Specifically, a washing column having two swivelable nozzles at the column top part of the washing column illustrated in FIG. 1 was used as the washing vessel for performing counter current washing.

Counter current washing was performed continuously for one hour by feeding a slurry of the same PAS polymer as in Working Example 1 at a rate of 40.0 kg/hr from the slurry feeding port 91 and ion-exchanged water serving at a rate of 8.0 kg/hr from the washing solution feeding port 92. The washing bath ratio was 2. Ion-exchanged water was sprayed from each of the two nozzles toward the surface S of the washing solution at 10 g/min (0.6 kg/hr).

The discharge rate of the washing drainage discharged from the washing drainage discharge port 94 was 2.0 kg/hr. No floating polymer of PAS was observed in the washing drainage. In addition, the amount of the slurry containing the PAS polymer particles discharged from the polymer discharge port 93 was 47.2 kg/hr. The slurry containing the polymer particles was dried to collect the PAS polymer particles. When the PAS polymer particles were weighed, the amount of the PAS per one hour of the step (IIIa) was 3.84 kg (product yield: 96.0%), and the average particle size of the obtained particles was 243 μm. The results are shown in Table 1.

Comparative Example 1

Washing was performed in the same manner as in Working Example 1 with the exception that step (IIIa) was as follows.

Specifically, in step (IIIa), a washing column in which the nozzle at the column top part was omitted from the washing column illustrated in the FIGURE was used as the washing vessel for performing washing.

Washing was performed continuously by feeding a slurry of the same PAS polymer as in Working Example 1 at a rate of 60.0 kg/hr from the slurry feeding port 91 and ion-exchanged water serving at a rate of 18.0 kg/hr from the washing solution feeding port 92. The washing bath ratio was 3.

The discharge rate of the washing drainage discharged from the washing drainage discharge port 94 was 48.0 kg/hr, and it was visually observed that the washing drainage contained a floating polymer of the PAS. In addition, the amount of the slurry containing the PAS polymer particles discharged from the polymer discharge port 93 was 30.0 kg/hr. The slurry containing the polymer particles was dried to collect the PAS polymer particles. When the PAS polymer particles were weighed, the amount of the PAS per one hour of step (IIIa) was 5.17 kg (product yield: 86.2%), and the average particle size of the obtained particles was 373 μm. The results are shown in Table 1.

is used may be small. In contrast, it can be seen that in the comparative example, even if a large amount of an aqueous washing solution is used, a floating polymer of the PAS particles originally intended to be collected as a product generated and leaked, and the product yield is low as a result.

(Step (IIIb), Treating a Slurry with Acid Using a Counter Current)

Next, PAS polymer particles that were separated and collected using counter current washing were charged into a re-slurry vessel, and an acetic acid aqueous solution was then infused and stirred to obtain a slurry of a PAS polymer having a liquid phase with an acetic acid concentration of 5 mass % as an acidic compound. The PAS polymer content in the slurry was 10 mass %.

Step (IIIb) of treating a slurry with acid using a counter current was performed using a washing column having one swivelable nozzle in roughly the center of the column top part illustrated in the FIGURE as the washing vessel for performing acid treatment.

Acid treatment was performed by respectively feeding a slurry of the PAS polymer containing an acidic compound at a rate of 50.0 kg/hr from the slurry feeding port 91 and an aqueous washing solution (ion-exchanged water) at a rate of 10.0 kg/hr from the washing solution feeding port 92, in order to continuously bring the slurry of the PAS polymer containing the acidic compound and the aqueous washing solution into contact for one hour using a counter current. The washing bath ratio was 2. Ion-exchanged water was sprayed toward from the nozzle toward the surface S of the aqueous washing solution at 10 g/min (0.6 kg/hr).

The discharge rate of the washing drainage discharged from the washing drainage discharge port 94 was 15.0 kg/hr. No floating polymer of PAS was observed in the washing drainage. In addition, the amount of the slurry containing the PAS polymer particles discharged from the polymer discharge port 93 was 45.6 kg/hr. The slurry containing the PAS polymer particles was dried, and when the polymer particles were weighed, the amount of the PAS per 1 hour of the counter current contact/acid treatment step was 4.76 kg.

INDUSTRIAL APPLICABILITY

With the production method for a PAS and a production apparatus for a PAS according to the present invention, it is possible to prevent the generation and leakage of a floating

TABLE 1

| | Shower type nozzle locations | Discharge rate of washing drainage (kg/hr) | Aqueous washing solution/polymer ratio | Amount of collected PAS (kg/hr) | Average particle size (μm) | Product yield (%) |
|---|---|---|---|---|---|---|
| Working Example 1 | Rotational flow One location | 15.0 | 2 | 4.76 | 230 | 95.2 |
| Working Example 2 | Rotational flow Two locations | 2.0 | 2 | 3.84 | 243 | 96.0 |
| Comparative Example 1 | No | 48.0 | 3 | 5.17 | 373 | 86.2 |

It can be seen from the results of Table 1 that with the production method for a PAS comprising step (IIIa) using a counter current washing device according to the present invention, it is possible to prevent the generation and leakage of a floating polymer generated in the steps of counter current washing and to improve the product yield, and the amount of washing solution (aqueous washing solution) that polymer generated during the washing step or the acid treatment step of the PAS. This makes it possible to improve the product yield and to obtain high-quality PAS particles, which has high industrial applicability. A PAS obtained by the production method and apparatus of the present invention is suitable for the application of a general melt processing method such as extrusion molding, injection molding, or compression molding, and the PAS can be suitably used as a sealant or coating for electronic parts, for example, in a wide range of fields such as electrical/electronic equipment and automobile equipment.

REFERENCE SIGNS LIST

1 Column top part
2 Main body part
3 Column base
4 Nozzle
5 Partition plate
6 Stirring blade
7 Stirring shaft
21 to 25 Stirring chambers
91 Slurry feeding port
92 Washing solution feeding port
93 Polymer discharge port
94 Washing drainage discharge port
S Washing solution surface

The invention claimed is:

1. A production method for a polyarylene sulfide comprising the steps of:
   (I) performing polymerization to produce a polymer via polymerization reaction on:
      at least one type of a sulfur source selected from the group consisting of an alkali metal sulfide and an alkali metal hydrosulfide; and
      a dihalo aromatic compound in an organic amide solvent;
   (II) separating and collecting a polymer from a reaction solution containing the polymer produced by the polymerization reaction;
   (III) washing a slurry of the collected polymer using a counter current by bringing the slurry into contact with at least one type of a washing solution selected from the group consisting of water, an organic solvent, and a mixed solution of water and an organic solvent, in a washing vessel, and/or;
      treating a slurry comprising an acid using a counter current by bringing the slurry comprising the collected polymer and an acidic compound into contact with an aqueous washing solution, in the washing vessel; and
   (IV) collecting the polymer after washing;
   wherein, in step (III), polyarylene sulfide particles floating on a surface of the washing solution or the aqueous washing solution are reduced by separating and eliminating a gas adsorbed onto a surface of the polyarylene sulfide particles by spraying an aqueous medium to the polyarylene sulfide particles floating on the surface of the washing solution or the aqueous washing solution in an upper part of the inside of the washing vessel.

2. The production method for a polyarylene sulfide according to claim 1, wherein the aqueous medium is sprayed by a nozzle device.

3. The production method for a polyarylene sulfide according to claim 2, wherein the nozzle device comprises a plurality of nozzles.

4. The production method for a polyarylene sulfide according to claim 2, wherein the nozzle device comprises a swivelable nozzle.

5. The production method for a polyarylene sulfide according to claim 1, wherein the washing vessel is a wash-column.

6. The production method for a polyarylene sulfide according to claim 1, wherein the acidic compound is hydrochloric acid or acetic acid.

7. The production method for a polyarylene sulfide according to claim 1, wherein step (III) is repeatedly performed more than once.

8. The production method for a polyarylene sulfide according to claim 1, wherein at least part of the slurry of the polymer contains a composition prepared outside the washing vessel.

9. The production method for a polyarylene sulfide according to claim 1, wherein, in step (I), a polymerization reaction is performed on at least one type of a sulfur source selected from the group consisting of an alkali metal sulfide and an alkali metal hydrosulfide and a dihalo aromatic compound in an organic amide solvent in the presence of a phase separation agent at a temperature of from 170 to 290° C.

10. The production method for a polyarylene sulfide according to claim 1, wherein a phase separation agent is added prior to step (II).

11. The production method for a polyarylene sulfide according to claim 9, wherein the phase separation agent is at least one type selected from the group consisting of water, an organic carboxylic acid metal salt, an organic sulfonic acid metal salt, an alkali metal halide, an alkali earth metal halide, a phosphoric acid alkali metal salt, alcohols, and paraffin-based hydrocarbons.

12. The production method for a polyarylene sulfide according to claim 1, wherein, prior to step (I), the production method comprises the steps of:
   (A) dehydrating a mixture by heating and reacting a mixture containing:
      an organic amide solvent;
      a sulfur source containing an alkali metal hydrosulfide; and
      an alkali metal hydroxide in an amount of from 0.95 to 1.05 mol per 1 mol of the alkali metal hydrosulfide;
      and discharging at least part of a distillate containing water from inside a system containing the mixture to the outside of the system; and
   (B) preparing a mixture by adding an alkali metal hydroxide and water as necessary to the mixture remaining inside the system after step (A) to adjust the mixture so that a total moles of an alkali metal hydroxide formed together with hydrogen sulfide produced at the time of dehydration, an alkali metal hydroxide prior to dehydration and the alkali metal hydroxide added after dehydration, is from 1.00 to 1.09 mol per 1 mol of the charged sulfur source and so that moles of water is from 0.02 to 2.0 mol per 1 mol of the charged sulfur source.

13. The production method for a polyarylene sulfide according to claim 1, further comprising:
   (V) re-separating a polyarylene sulfide particle by feeding the washing drainage discharged from the washing vessel to a polyarylene sulfide particle re-separation unit loaded with a filter to capture polyarylene sulfide particles and then re-separate and discharge the polyarylene sulfide particles from the filter.

14. The production method for a polyarylene sulfide according to claim 13, wherein step (V) is repeatedly performed more than once.

15. The production method for a polyarylene sulfide comprising the step of:
   washing a slurry of the polyarylene sulfide using a counter current by bringing the slurry into contact with at least one type of a washing solution selected from the group consisting of water, an organic solvent, and a mixed solution of water and an organic solvent, in a washing vessel; and/or treating a slurry comprising the polyarylene sulfide and an acidic compound using a counter current by bringing the slurry comprising the polyarylene sulfide and the acidic compound into contact with an aqueous washing solution, in the washing vessel, wherein polyarylene sulfide particles floating on a surface of the washing solution or the aqueous washing solution are reduced by separating and eliminating a gas adsorbed onto a surface of the polyarylene sulfide particles by spraying an aqueous medium to the polyarylene sulfide particles floating on the surface of the washing solution or the aqueous washing solution in an upper part of the inside of the washing vessel during washing.

* * * * *